US012604005B2

(12) United States Patent
Dai

(10) Patent No.: US 12,604,005 B2
(45) Date of Patent: Apr. 14, 2026

(54) VIDEO DECODING METHOD, VIDEO ENCODING METHOD, AND VIDEO DECODER

(71) Applicant: GUANGDONG OPPO MOBILE TELECOMMUNICATIONS CORP., LTD., Dongguan (CN)

(72) Inventor: Zhenyu Dai, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 18/950,067

(22) Filed: Nov. 16, 2024

(65) Prior Publication Data

US 2025/0080737 A1      Mar. 6, 2025

Related U.S. Application Data

(63) Continuation of application No. PCT/CN2022/093581, filed on May 18, 2022.

(51) Int. Cl.
| | |
|---|---|
| *H04N 7/12* | (2006.01) |
| *H04N 19/117* | (2014.01) |
| *H04N 19/126* | (2014.01) |
| *H04N 19/154* | (2014.01) |
| *H04N 19/176* | (2014.01) |

(52) U.S. Cl.
CPC ......... *H04N 19/126* (2014.11); *H04N 19/117* (2014.11); *H04N 19/154* (2014.11); *H04N 19/176* (2014.11)

(58) Field of Classification Search
CPC .................................................. H04N 19/117
See application file for complete search history.

(56) References Cited

U.S. PATENT DOCUMENTS

| | | |
|---|---|---|
| 2019/0281295 A1 | 9/2019 | Ichigaya et al. |
| 2020/0236354 A1 | 7/2020 | Bordes et al. |

FOREIGN PATENT DOCUMENTS

| | | |
|---|---|---|
| CN | 104113765 A | 10/2014 |
| CN | 111711824 A | 9/2020 |
| CN | 112335242 A | 2/2021 |

(Continued)

OTHER PUBLICATIONS

Yue Li et al. "EE1-1.2: Test on Deep In-Loop Filter with Adaptive Model Selection and External Attention", Bytedance Inc., Document: JVET-X0065-v1, Joint Video Experts Team (JVET) of ITU-T SG 16 WP 3 and ISO/IEC JTC 1/SC 29 24th Meeting, by teleconference, Oct. 6-15, 2021. 5 pages.

(Continued)

*Primary Examiner* — Y Lee
(74) *Attorney, Agent, or Firm* — Sheppard, Mullin, Richter & Hampton LLP

(57) ABSTRACT

Embodiments of the present disclosure provide video decoding method, a video encoding method, and a video decoder. A decoding end operates as follows. A bitstream is decoded and a reconstructed block of a current block is determined. The bitstream is decoded and a first quantization parameter (QP) of the current block is determined, where the first QP is determined based on a second QP predicted through a QP prediction model. The reconstructed block of the current block is filtered with a neural network-based filter according to the first QP, to obtain a filtered reconstructed block.

20 Claims, 14 Drawing Sheets

(56)　　　　　　References Cited

FOREIGN PATENT DOCUMENTS

| | | | |
|---|---|---|---|
| CN | 113497941 | A | 10/2021 |
| CN | 113766249 | A | 12/2021 |

OTHER PUBLICATIONS

Yue Li et al. "EE1-1.6: Combined Test of EE1-1.2 and EE1-1.4", Bytedance Inc., Qualcomm Inc., Document: JVET-X0066-v1, Joint Video Experts Team (JVET) of ITU-T SG 16 WP 3 and ISO/IEC JTC 1/SC 29 24th Meeting, by teleconference, Oct. 6-15, 2021. 5 pages.

Liqiang Wang et al. "EE1-1.1: neural network based in-loop filter with constrained storage and low complexity", Tencent, Document: JVET-Y0078-v2, Joint Video Experts Team (JVET) of ITU-T SG 16 WP 3 and ISO/IEC JTC 1/SC 29 25th Meeting, by teleconference, Jan. 12-21, 2022. 5 pages.

WIPO, International Search Report and Written Opinion for International Application No. PCT/CN2022/093581, Nov. 30, 2022. 13 pages (with English translation).

Shuai Xin, et al., "A video compression artifact reduction approach combined with quantization parameters estimation", The Journal of Supercomputing, vol. 78, No. 11, Mar. 21, 2022, 19 pages.

Zhihuang Xie, et al., "EE1-related: on BaseQP parameter in EE1-1.1", OPPO, Document: JVET-Z0128-v1, Joint Video Experts Team (JVET) of ITU-T SG 16 WP 3 and ISO/IEC JTC 1/SC 29, 26th Meeting, by teleconference, Apr. 20-29, 2022, 4 pages.

Extended European search report issued in corresponding European application No. 22942011.2 dated Dec. 16, 2025, 9 pages.

DECODE FIRST BITSTREAM AND DETERMINE RECONSTRUCTED BLOCK OF CURRENT BLOCK ∽ S501

DECODE BITSTREAM AND DETERMINE FIRST QP OF CURRENT BLOCK ∽ S502

FILTER, ACCORDING TO FIRST QP, RECONSTRUCTED BLOCK OF CURRENT BLOCK WITH NEURAL NETWORK-BASED FILTER, TO OBTAIN FILTERED RECONSTRUCTED BLOCK ∽ S503

| 3X3 Conv |
| --- |
| MAXPOOL 2d |
| 3X3 Conv |
| MAXPOOL 2d |
| 3X3 Conv |
| MAXPOOL 2d |
| FULL CONNECT |
| PReLU |
| FULL CONNECT |
| Softmax |

FIG. 6

RECONSTRUCT CURRENT BLOCK TO OBTAIN
RECONSTRUCTED BLOCK OF CURRENT BLOCK                    S701

PREDICT SECOND QP OF CURRENT BLOCK THROUGH QP
PREDICTION MODEL                    S702

DETERMINE FIRST QP ACCORDING TO SECOND QP                    S703

FILTER, ACCORDING TO FIRST QP, RECONSTRUCTED
BLOCK OF CURRENT BLOCK WITH NEURAL NETWORK-
BASED FILTER, TO OBTAIN FILTERED RECONSTRUCTED
BLOCK                    S704

VIDEO DECODING METHOD, VIDEO ENCODING METHOD, AND VIDEO DECODER

CROSS-REFERENCE TO RELATED APPLICATION(S)

This application is a continuation of International Application No. PCT/CN2022/093581, filed May 18, 2022, the disclosure of which is hereby incorporated by reference in its entirety.

TECHNICAL FIELD

This disclosure relates to the technical field of video coding, and in particular to a video decoding method, a video encoding method, and a video decoder.

BACKGROUND

Digital video technology may be incorporated into multiple video apparatuses such as a digital television, a smart mobile phone, a computer, an e-reader, a video player, etc. With the development of video technology, video data includes an enormous amount of data. To facilitate video data transmission, a video apparatus implements a video compression technology to enable more effective transmission or storage of the video data.

Distortion may occur in a process of video compression. To reduce the distortion, a reconstructed picture is filtered to improve the quality of the reconstructed picture. With the rapid development of neural network technology, the reconstructed picture can be filtered with a neural network-based filter currently. Since the setting of a quantization parameter (QP) plays a decisive role in the quality of a coding picture, to further improve the filtering quality of the picture, the QP needs to be determined, and the determined QP will serve as an input into the neural network-based filter.

However, currently, in the method for determining the QP, the accuracy of the determined QP is not high, thereby resulting in a poor coding effect.

SUMMARY

In a first aspect, a video decoding method is provided in the present disclosure. The video decoding method includes the following. A bitstream is decoded and a reconstructed block of a current block is determined. The bitstream is decoded and a first quantization parameter (QP) of the current block is determined, where the first QP is determined based on a second QP predicted through a QP prediction model. The reconstructed block of the current block is filtered with a neural network-based filter according to the first QP, to obtain a filtered reconstructed block.

In a second aspect, a video encoding method is provided in embodiments of the present disclosure. The video encoding method includes the following. A current block is reconstructed to obtain a reconstructed block of the current block. A second QP of the current block is predicted through a QP prediction model. A first QP of the current block is determined according to the second QP. The reconstructed block of the current block is filtered with a neural network-based filter according to the first QP, to obtain a filtered reconstructed block.

In a third aspect, a video decoder is provided. The video decoder includes at least one processor and a memory. The memory is coupled to the at least one processor and stores at least one computer executable instruction thereon. When executed by the at least one processor, the at least one computer executable instruction causes the at least one processor to perform the method of the first aspect.

BRIEF DESCRIPTION OF THE DRAWINGS

FIG. 6 is a schematic diagram of a quantization parameter (QP) prediction model provided in embodiments of the present disclosure.

DETAILED DESCRIPTION

The following will describe technical solutions of embodiments of the present disclosure with reference to the accompanying drawings in embodiments of the present disclosure.

The present disclosure can be applied to the fields of picture coding, video coding, hardware video coding, dedicated circuit video coding, real-time video coding, etc. For example, the solution in the present disclosure may be incorporated into audio video coding standards (AVS), such as H.264/audio video coding (AVC) standard, H.265/high efficiency video coding (HEVC) standard, and H.266/versatile video coding (VVC) standard. Alternatively, the solution in the present disclosure may incorporated into other proprietary or industry standards, including ITU-TH.261, ISO/IECMPEG-1 Visual, ITU-TH.262 or ISO/IECMPEG-2Visual, ITU-TH.263, ISO/IECMPEG-4Visual, ITU-TH.264 (also known as ISO/IECMPEG-4AVC), including scalable video coding (SVC) and multi-view video coding (MVC) extensions. It may be understood that the techniques in the present disclosure are not limited to any particular coding standard or technology.

Figure 1:
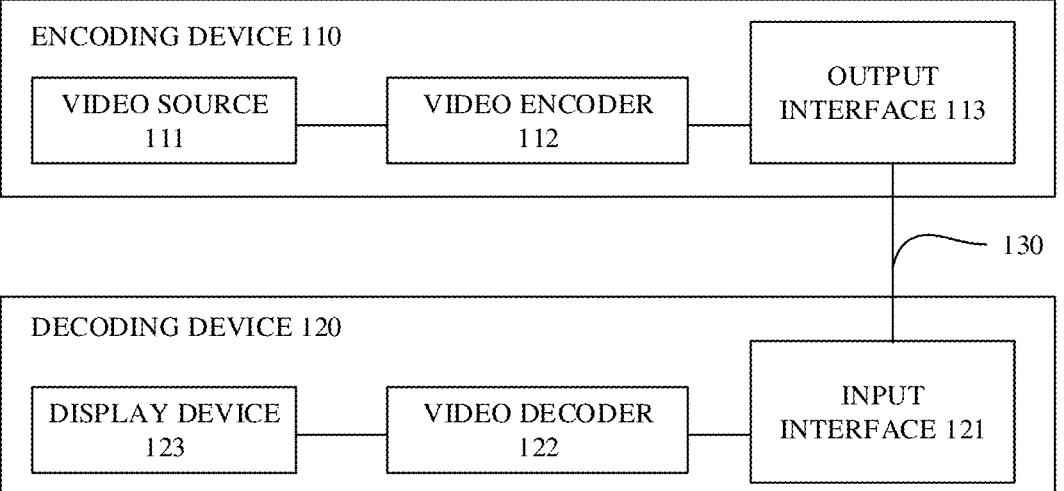
FIG. 1 is a schematic block diagram of a video coding system involved in embodiments of the present disclosure.

For ease of understanding, a video coding system in embodiments of the present disclosure is first introduced with reference to FIG. 1.

FIG. 1 is a schematic block diagram of a video coding system according to embodiments of the present disclosure. It may be noted that FIG. 1 is only an example, and the video coding system in embodiments of the present disclosure includes but is not limited to what is illustrated in FIG. 1. As illustrated in FIG. 1, the video coding system 100 includes an encoding apparatus 110 and a decoding apparatus 120. The encoding apparatus is configured to encode (which can be understood as "compress") video data to generate a bitstream, and transmit the bitstream to the decoding apparatus. The decoding apparatus decodes the bitstream generated by the encoding apparatus to obtain decoded video data.

The encoding apparatus 110 in embodiments of the present disclosure can be understood as a device having a video encoding function, and the decoding apparatus 120 can be understood as a device having a video decoding function, that is, the encoding apparatus 110 and the decoding apparatus 120 in embodiments of the present disclosure include a wider range of devices, including smartphones, desktop computers, mobile computing devices, notebook (such as laptop) computers, tablet computers, set-top boxes, televisions, cameras, display devices, digital media players, video game consoles, vehicle-mounted computers, and the like.

In some embodiments, the encoding apparatus 110 may transmit encoded video data (such as bitstream) to the decoding apparatus 120 via a channel 130. The channel 130 may include one or more media and/or apparatuses capable of transferring the encoded video data from the encoding apparatus 110 to the decoding apparatus 120.

In an example, channel 130 includes one or more communication media that enable the encoding apparatus 110 to transmit the encoded video data directly to the decoding apparatus 120 in real-time. In this example, the encoding apparatus 110 may modulate the encoded video data according to a communication standard and transmit the modulated video data to the decoding apparatus 120. The communication medium includes a wireless communication medium, such as a radio frequency spectrum. Optionally, the communication medium may also include a wired communication medium, such as one or more physical transmission lines.

In another example, the channel 130 includes a storage medium that can store video data encoded by the encoding apparatus 110. The storage medium includes a variety of local access data storage media, such as optical discs, DVDs, flash memory, and the like. In this example, the decoding apparatus 120 may obtain encoded video data from the storage medium.

In another example, the channel 130 may include a storage server that may store video data encoded by the encoding apparatus 110. In this example, the decoding apparatus 120 may download the stored encoded video data from the storage server. Optionally, the storage server may store the encoded video data and may transmit the encoded video data to the decoding apparatus 120. For example, the storage server may be a web server (e.g., for a website), a file transfer protocol (FTP) server, and the like.

In some embodiments, the encoding apparatus 110 includes a video encoder 112 and an output interface 113. The output interface 113 may include a modulator/demodulator (modem) and/or a transmitter.

In some embodiments, the encoding apparatus 110 may include a video source 111 in addition to the video encoder 112 and the input interface 113.

The video source 111 may include at least one of a video capture apparatus (for example, a video camera), a video archive, a video input interface, or a computer graphics system, where the video input interface is configured to receive video data from a video content provider, and the computer graphics system is configured to generate video data.

The video encoder 112 encodes the video data from the video source 111 to generate a bitstream. The video data may include one or more pictures or a sequence of pictures. The bitstream contains encoding information of a picture or a sequence of pictures. The encoding information may include encoded picture data and associated data. The associated data may include a sequence parameter set (SPS), a picture parameter set (PPS), and other syntax structures. The SPS may contain parameters applied to one or more sequences. The PPS may contain parameters applied to one or more pictures. The syntax structure refers to a set of zero or multiple syntax elements arranged in a specified order in the bitstream.

The video encoder 112 directly transmits the encoded video data to the decoding apparatus 120 via the output interface 113. The encoded video data may also be stored on a storage medium or a storage server for subsequent reading by the decoding apparatus 120.

In some embodiments, the decoding apparatus 120 includes an input interface 121 and a video decoder 122.

In some embodiments, the decoding apparatus 120 may include a display device 123 in addition to the input interface 121 and the video decoder 122.

The input interface 121 includes a receiver and/or a modem. The input interface 121 may receive encoded video data through the channel 130.

The video decoder 122 is configured to decode the encoded video data to obtain decoded video data, and transmit the decoded video data to the display device 123.

The display device 123 displays the decoded video data. The display device 123 may be integrated with the decoding apparatus 120 or external to the decoding apparatus 120. The display device 123 may include various display devices, such as a liquid crystal display (LCD), a plasma display, an organic light emitting diode (OLED) display, or other types of display devices.

In addition, FIG. 1 is only an example, and the technical solutions of the embodiments of the present disclosure are not limited to FIG. 1. For example, the technology of the present disclosure may also be applied to one-sided video encoding or one-sided video decoding.

A video encoder in embodiments of the present disclosure will be introduced below.

Figure 2:
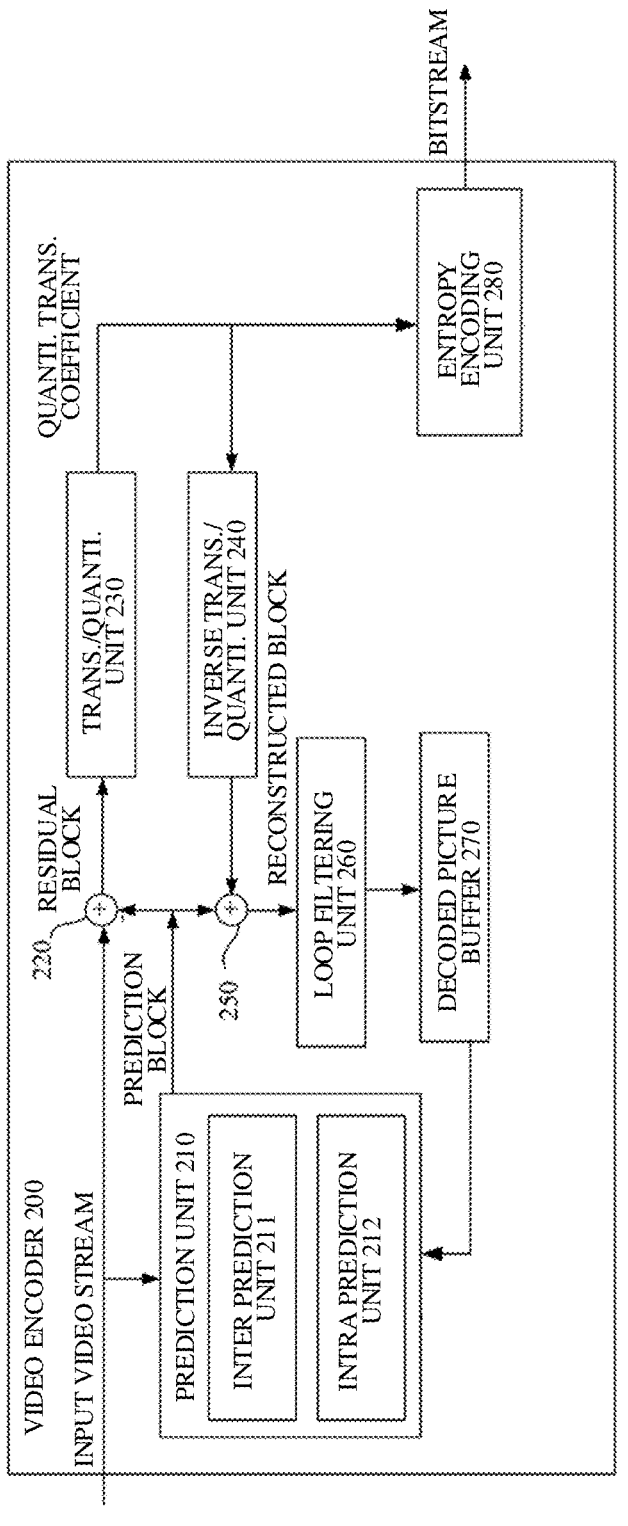
FIG. 2 is a schematic block diagram of a video encoder involved in embodiments of the present disclosure.

FIG. 2 is a schematic block diagram of a video encoder provided in embodiments of the present disclosure. It may be understood that the video encoder 200 may be configured to perform lossy compression or lossless compression on a picture. The lossless compression may be visually lossless compression or mathematically lossless compression.

The video encoder 200 may be applied to picture data in luma-chroma (YCbCr, YUV) format. For example, a YUV ratio can be 4:2:0, 4:2:2, or 4:4:4, where Y indicates luminance (Luma), Cb (U) indicates blue chrominance, and Cr (V) indicates red chrominance. U and V represent chrominance (Chroma) for describing colour and saturation. For example, in terms of colour format, 4:2:0 indicates that every 4 pixels have 4 luma components and 2 chroma components (YYYYCbCr), 4:2:2 indicates that every 4 pixels have 4 luma components and 4 chroma components (YYYYCbCrCbCr), and 4:4:4 indicates full pixel display (YYYYCbCrCbCrCbCrCbCr).

For example, the video encoder 200 reads video data, and for each picture in the video data, divides the picture into several coding tree units (CTU). In some examples, the CTU may be referred to as "tree block", "largest coding unit" (LCU), or "coding tree block" (CTB). Each CTU may be associated with a pixel block of the same size as the CTU within the picture. Each pixel may correspond to one luminance (luma) sample and two chrominance (chroma) samples. Thus, each CTU may be associated with one luma sample block and two chroma sample blocks. The CTU may have a size of 128×128, 64×64, 32×32, and so on. The CTU may be further divided into several coding units (CUs) for coding. The CU may be a rectangular block or a square block. The CU may be further divided into a prediction unit (PU) and a transform unit (TU), so that coding, prediction, and transform are separated, and thus processing is more flexible. In an example, the CTU is divided into CUs in a quadtree manner, and the CU is divided into TUs and PUs in a quadtree manner.

The video encoder and the video decoder can support various PU sizes. Assuming that a size of a specific CU is 2N×2N, video encoders and video decoders may support PUs of 2N×2N or N×N for intra prediction, and support symmetric PUs of 2N×2N, 2N×N, N×2N, N×N, or similar size for inter prediction. The video encoder and video decoder may also support asymmetric PUs of 2N×nU, 2N×nD, nL×2N, or nR×2N for inter prediction.

In some embodiments, as illustrated in FIG. 2, the video encoder 200 may include a prediction unit 210, a residual unit 220, a transform/quantization unit 230, an inverse transform/quantization unit 240, a reconstruction unit 250, a loop filtering unit 260, a decoded picture buffer 270, and an entropy encoding unit 280. It may be noted that the video encoder 200 may include more, less, or different functional components.

Optionally, in the present disclosure, a current block may be referred to as "current CU" or "current PU". A prediction block may be referred to as "prediction picture block" or "picture prediction block", and a reconstructed block may be referred to as "reconstructed picture block" or "picture reconstructed block".

In some embodiments, the prediction unit 210 includes an inter prediction unit 211 and an intra prediction unit 212. Since there is a strong correlation between adjacent samples in a video picture, intra prediction is used in the video coding technology to eliminate spatial redundancy between adjacent samples. Since there is a strong similarity between adjacent pictures in video, inter prediction is used in the video coding technology to eliminate temporal redundancy between adjacent pictures, thereby improving encoding efficiency.

The inter prediction unit 211 may be used for inter prediction. The inter prediction can refer to picture information of different pictures. In inter prediction, motion information is used to find a reference block from a reference picture, and a prediction block is generated according to the reference block to eliminate temporal redundancy. A picture for which inter prediction is used may be a P frame and/or a B frame, where P frame refers to a forward predicted picture, and B frame refers to a bidirectional predicted picture. The motion information includes a reference picture list containing the reference picture, a reference picture index, and a motion vector. The motion vector can be a full-sample motion vector or a sub-sample motion vector. If the motion vector is the sub-sample motion vector, interpolation filtering on the reference picture is required to generate a required sub-sample block. Here, a block of full-samples or sub-samples found in the reference picture according to the motion vector is called a reference block. In some technologies, the reference block may be referred to as a prediction block, and in some technologies, the prediction block will be generated based on the reference block. Generating the prediction block based on the reference block may also be understood as taking the reference block as a prediction block and then processing and generating a new prediction block based on the prediction block.

Figure 5:
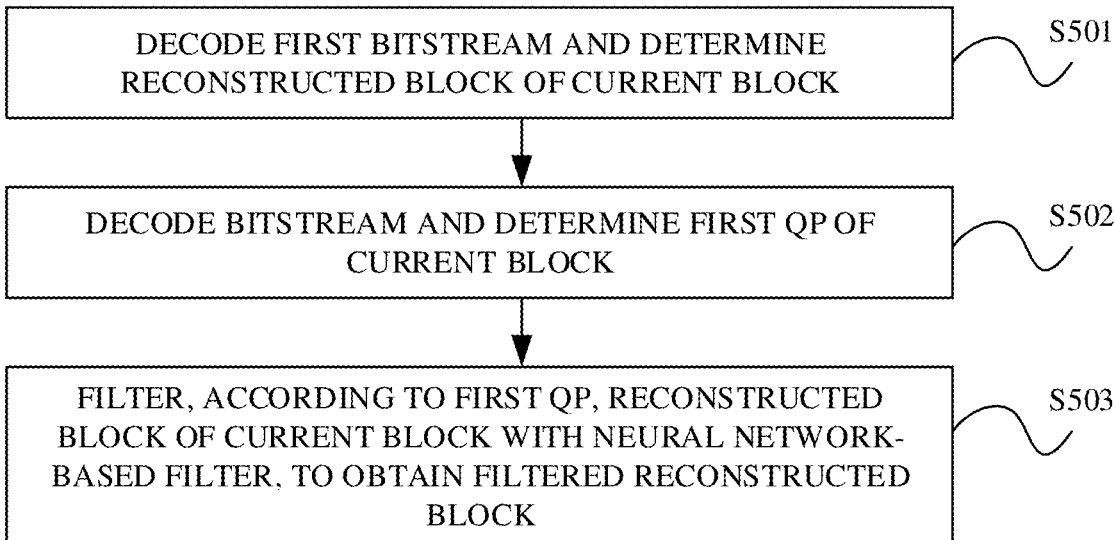
FIG. 5 is a schematic flowchart of a video decoding method provided in embodiments of the present disclosure.

The intra prediction unit 212 predicts sample information of the current block only referring to information of the same picture, so as to eliminate spatial redundancy. I frame is used in intra prediction. For example, as illustrated in FIG. 5, a white 4×4 block is a current block, and gray samples on the left row and upper column of the current block are reference samples of the current block. These reference samples may be used to predict the current block in intra prediction. These reference samples may all be available, that is, all reference samples have been coded. Some of the reference samples may be unavailable. For example, the current block is in the leftmost of the whole picture, so the reference samples on the left of the current block are unavailable. For another example, when the current block is being coded, the lower left part of the current block has not been coded, so the reference samples at the lower left are also unavailable. For the case where the reference samples are unavailable, filling may be performed using the available reference samples or some values, or using some methods, or no filling is performed.

In some embodiments, the intra prediction method further includes a multiple reference line (MRL) intra prediction method. More reference samples may be used in MRL to improve coding efficiency.

There are multiple prediction modes for intra prediction. For example, there are 9 modes for performing intra prediction on a 4×4 block in H.264. In mode 0, samples above the current block are copied to the current block in the vertical direction as prediction values. In mode 1, reference samples on the left are copied to the current block in the horizontal direction as prediction values. In mode 2 (DC), an average value of 8 samples A~D and I~L is used as prediction values of all samples. In modes 3 to 8, reference samples are copied to corresponding positions of the current block according to a certain angle. Because some positions in the current block cannot exactly correspond to the reference samples, a weighted average of the reference samples may be required, or interpolated sub-samples of the reference samples may be required.

Intra prediction modes used in HEVC include a planar mode (Planar), a DC, and 33 angular modes, with a total of 35 prediction modes. Intra modes used in VVC include a Planar, a DC, and 65 angular modes, with a total of 67 prediction modes. Intra modes used in AVS3 include a DC, a Plane, a Bilinear, and 63 angular modes, with a total of 66 prediction modes.

It may be noted that with the increase in the number of angular modes, the intra prediction will be more accurate, which will be more in line with the demand for the development of high-definition and ultra-high-definition digital video.

The residual unit 220 may generate a residual block of the CU based on a sample block of the CU and a prediction block of a PU of the CU. For example, the residual unit 220 may generate the residual block for the CU such that each sample in the residual block has a value equal to a difference between a sample in the sample block of the CU and a corresponding sample in the prediction block of the PU of the CU.

The transform/quantization unit 230 may quantize transform coefficients. The transform/quantization unit 230 may quantize transform coefficients associated with a TU of a CU based on a quantization parameter (QP) value associated with the CU. The video encoder 200 may adjust the degree of quantization applied to transform coefficients associated with the CU by adjusting the QP value associated with the CU.

The inverse transform/quantization unit 240 may perform inverse quantization and inverse transform respectively on the quantized transform coefficients to reconstruct a residual block from the quantized transform coefficients.

The reconstruction unit 250 may add samples in the reconstructed residual block with corresponding samples in one or more prediction blocks generated by the prediction unit 210 to generate a reconstructed block associated with the TU. By reconstructing sample blocks of each TU of the CU in this way, the video encoder 200 can reconstruct the sample block of the CU.

The loop filtering unit 260 may perform deblocking filtering operation to reduce blocking of the sample block associated with the CU.

In some embodiments, the loop filtering unit 260 includes a deblocking filtering unit, a sample adaptive offset (SAO) unit, and an adaptive loop filtering (ALF) unit.

The decoded picture buffer 270 may buffer reconstructed sample blocks. The inter prediction unit 211 may use reference pictures containing reconstructed sample blocks to perform inter prediction on PUs of other pictures. In addition, the intra prediction unit 212 may use the reconstructed sample blocks in the decoded picture buffer 270 to perform intra prediction on other PUs in the same picture as the CU.

The entropy encoding unit 280 may receive the quantized transform coefficients from the transform/quantization unit 230. The entropy encoding unit 280 may perform one or more entropy encoding operations on the quantized transform coefficients to generate entropy encoded data.

A basic process of video encoding in the present disclosure is as follows. At an encoding end, a current picture (or frame) is partitioned into blocks, and for a current block, the prediction unit 210 performs intra prediction or inter prediction to generate a prediction block of the current block. The residual unit 220 may calculate a residual block based on the prediction block and an original block of the current block, that is, a difference obtained by subtracting the prediction block from the original block of the current block, where the residual block may also be referred to as "residual information". The residual block can be transformed and quantized by the transform/quantization unit 230 to remove information that is not sensitive to human eyes, so as to eliminate visual redundancy. Optionally, the residual block before being transformed and quantized by the transform/ quantization unit 230 may be referred to as "time-domain residual block", and the time-domain residual block after being transformed and quantized by the transform/quantization unit 230 may be referred to as "frequency residual block" or "frequency-domain residual block". The entropy encoding unit 280 receives quantized transform coefficients output by the transform/quantization unit 230, and may perform entropy encoding on the quantized transform coefficients to output a bitstream. For example, the entropy encoding unit 280 can eliminate character redundancy according to the target context model and probability information of the binary bitstream.

In addition, the video encoder performs inverse quantization and inverse transform on the quantized transform coefficients output by the transform/quantization unit 230 to obtain the residual block of the current block, and then adds the residual block of the current block to the prediction block of the current block to obtain the reconstructed block of the current block. As the encoding proceeds, reconstructed blocks corresponding to other blocks in the current picture can be obtained, and these reconstructed blocks are concatenated to obtain a reconstructed picture of the current picture. An error is introduced in encoding. To reduce the error, the reconstructed picture is filtered. For example, the reconstructed picture is filtered with the ALF to reduce a difference between the sample value of a sample in the reconstructed picture and the original sample value of the sample in the current picture. The filtered reconstructed picture is stored in the decoded picture buffer 270 as a reference picture of a subsequent picture for inter prediction.

It can be noted that block partition information determined at the encoding end, as well as mode information or parameter information for prediction, transform, quantization, entropy coding, loop filtering, etc., are carried in the bitstream when necessary. The decoding end parses the bitstream and analyzes existing information to determine the block partition information, as well as mode information or parameter information for prediction, transform, quantization, entropy coding, loop filtering, etc. the same as such information at the encoding end, so as to ensure the decoding picture obtained by the encoding end is the same as the decoded picture obtained by the decoding end.

Figure 3:
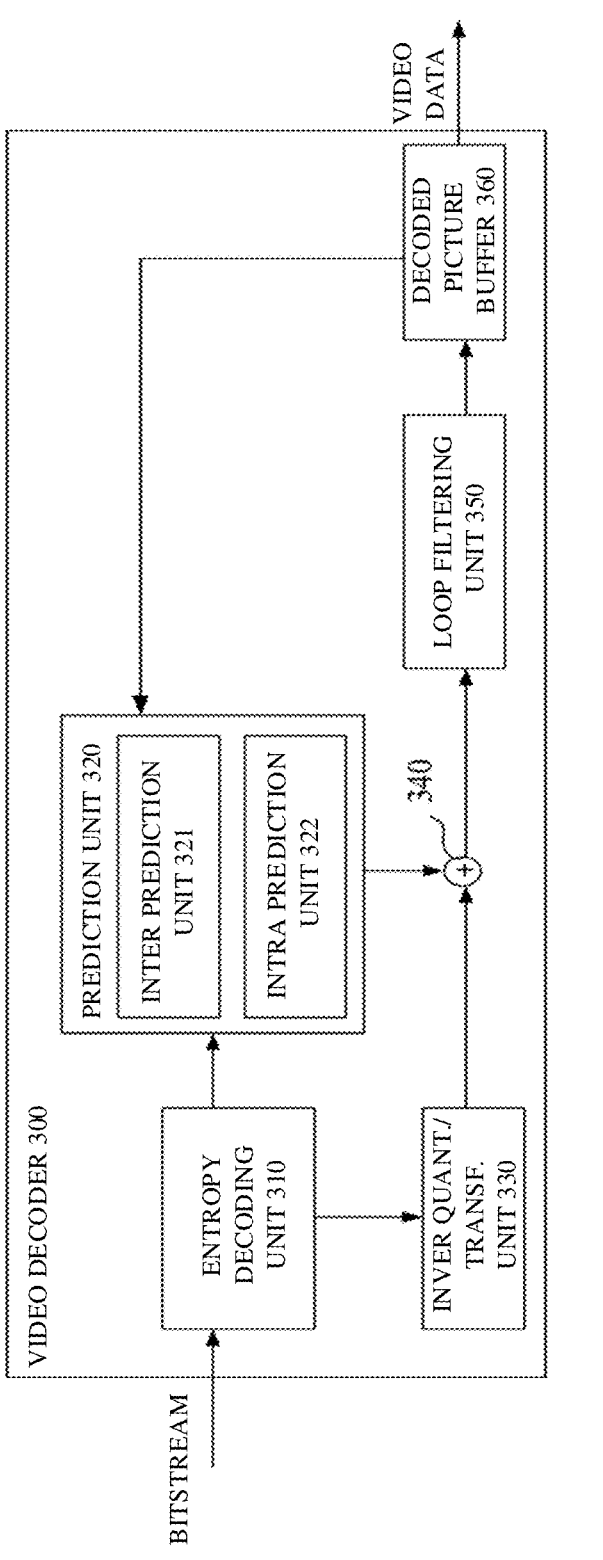
FIG. 3 is a schematic block diagram of a video decoder involved in embodiments of the present disclosure.

FIG. 3 is a schematic block diagram of a video decoder provided in embodiments of the present disclosure.

As illustrated in FIG. 3, the video decoder 300 includes an entropy decoding unit 310, a prediction unit 320, an inverse quantization/transform unit 330, a reconstruction unit 340, a loop filtering unit 350, and a decoded picture buffer 360. It may be noted that the video decoder 300 may include more, less, or different functional components.

The video decoder 300 may receive a bitstream. The entropy decoding unit 310 may parse the bitstream to extract syntax elements from the bitstream. As part of parsing the bitstream, the entropy decoding unit 310 may parse entropy-encoded syntax elements in the bitstream. The prediction unit 320, the inverse quantization/transform unit 330, the reconstruction unit 340, and the loop filtering unit 350 may decode video data according to the syntax elements extracted from the bitstream, that is, generate decoded video data.

In some embodiments, the prediction unit 320 includes an inter prediction unit 321 and an intra prediction unit 322.

The inter prediction unit 321 may perform intra prediction to generate a prediction block of a PU. The inter prediction unit 321 may use an intra-prediction mode to generate a prediction block of the PU based on a sample block of spatially neighboring PUs. The inter prediction unit 321 may also determine an intra prediction mode for the PU from one or more syntax elements parsed from the bitstream.

The intra prediction unit 322 can construct a first reference picture list (list 0) and a second reference picture list (list 1) according to the syntax elements parsed from the bitstream. Furthermore, the entropy decoding unit 310 may parse motion information of the PU if the PU is encoded using inter prediction. The intra prediction unit 322 may determine one or more reference blocks for the PU according to the motion information of the PU. The intra prediction unit 322 may generate a prediction block of the PU based on one or more reference blocks of the PU.

The inverse quantization/transform unit 330 may perform inverse quantization on (i.e., dequantize) transform coefficients associated with a TU. The inverse quantization/transform unit 330 may use a QP value associated with a CU of the TU to determine the degree of quantization.

After the inverse quantization of the transform coefficients, the inverse quantization/transform unit 330 may perform one or more inverse transformations on the inverse-quantized transform coefficients in order to generate a residual block associated with the TU.

The reconstruction unit 340 uses the residual blocks associated with the TU of the CU and the prediction block of the PU of the CU to reconstruct a sample block of the CU. For example, the reconstruction unit 340 may add samples in the residual block with corresponding samples in the prediction block to reconstruct the sample block of the CU to obtain the reconstructed picture block.

The loop filtering unit 350 may perform deblocking filtering to reduce blocking of the sample block associated with the CU.

In some embodiments, the loop filtering unit 260 includes a deblocking filtering unit, an SAO unit, and an ALF unit.

The video decoder 300 may store the reconstructed picture of the CU in decoded picture buffer 360. The video decoder 300 may use the reconstructed picture in the decoded picture buffer 360 as a reference picture for subsequent prediction, or transmit the reconstructed picture to a display device for display.

A basic process of video decoding in the present disclosure is as follows. The entropy decoding unit 310 may parse the bitstream to obtain prediction information, a quantized coefficient matrix, etc. of the current block, and the prediction unit 320 performs intra prediction or inter prediction on the current block based on the prediction information to generate a prediction block of the current block. The inverse quantization/transform unit 330 uses the quantized coefficient matrix obtained from the bitstream to perform inverse quantization and inverse transform on the quantized coefficient matrix to obtain a residual block. The reconstruction unit 340 adds the prediction block to the residual block to obtain a reconstructed block. The reconstructed blocks form a reconstructed picture. The loop filtering unit 350 performs loop filtering on the reconstructed picture on a picture basis or on a block basis to obtain a decoded picture. The decoded picture may also be referred to as "reconstructed picture", and the reconstructed picture may be displayed on the display device or may be stored in the decoded picture buffer 360 as a reference picture of a subsequent picture for inter prediction.

The above is the basic process of video coding under a block-based hybrid coding framework. With the development of technology, some modules or steps of the framework or process may be optimized. This disclosure is applicable to the basic process of the video coding under the block-based hybrid coding framework, but is not limited to the framework and process.

As can be seen from the above, in existing video coding standards, such as VVC, a traditional loop filtering module mainly includes tools such as a deblocking filter (DBF), an SAO, and an ALF. In recent years, with the development of deep-learning technology, the exploration of neural network-based filters has been gradually carried out.

During research work of VVC, a neural network-based video coding exploration experiment group (NNVC, EE1) has been established to encourage related exploration and research. For the loop filtering module, many high-performance neural network-based filters have been proposed.

Figure 4A:
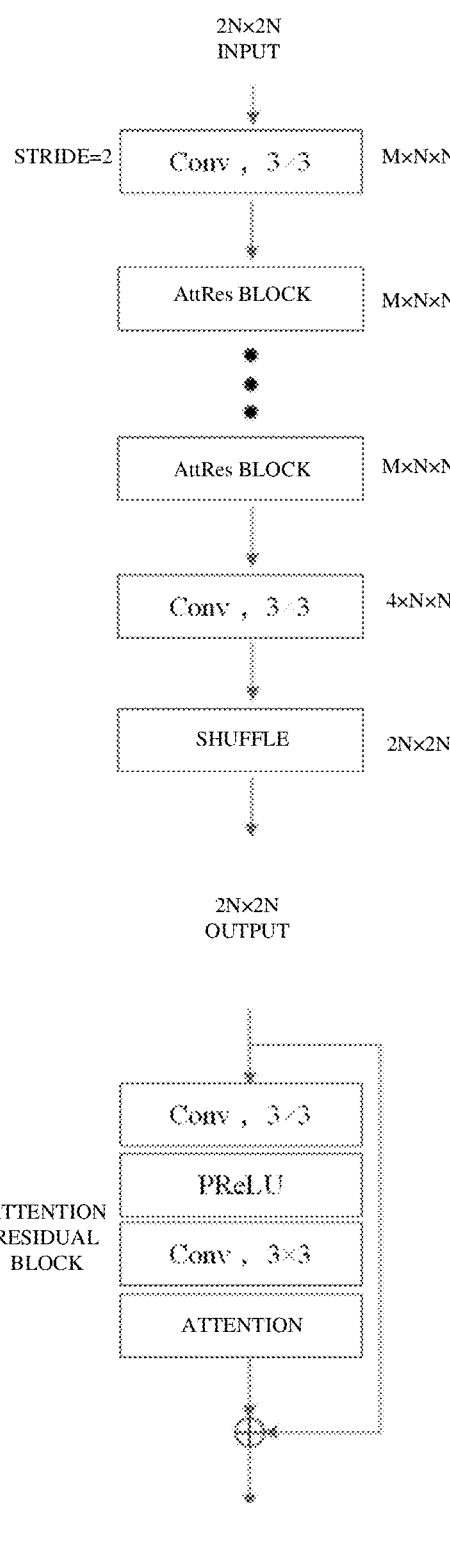
FIG. 4A is a schematic diagram of a neural network-based filter involved in embodiments of the present disclosure.

In some embodiments, JVET-X0065 illustrated in FIG. 4A is proposed. JVET-X0065 is a residual learning-based convolutional neural network (CNN) filter to filter and optimize an input reconstructed picture, so that a final output picture is closer to an original picture, thereby improving the coding performance.

Since the setting of the QP plays a decisive role in the quality of a coding picture, in JVET-X0065, for different base quantization parameters (BQPs), e.g., {22, 27, 32, 37, 42}, different training sets are generated and various filtering network models are trained to process corresponding reconstructed pictures. Meanwhile, the multi-model solution also brings certain problems, for example, more space is required to store the models, the generalization ability of the models is not strong, longer training time is required, etc.

Therefore, in some embodiments, in JVET-X0066, the BQP is further input into the network. In this way, only one filtering network model is required to be trained. Meanwhile, a BQP candidate set, e.g., {BQP, BQP-5, BQP+5}, is proposed. In this way, an optimal BQP is selected by traversing and calculating a rate-distortion cost at the encoding end, thereby improving the performance of the filtering network model.

Figure 4B:
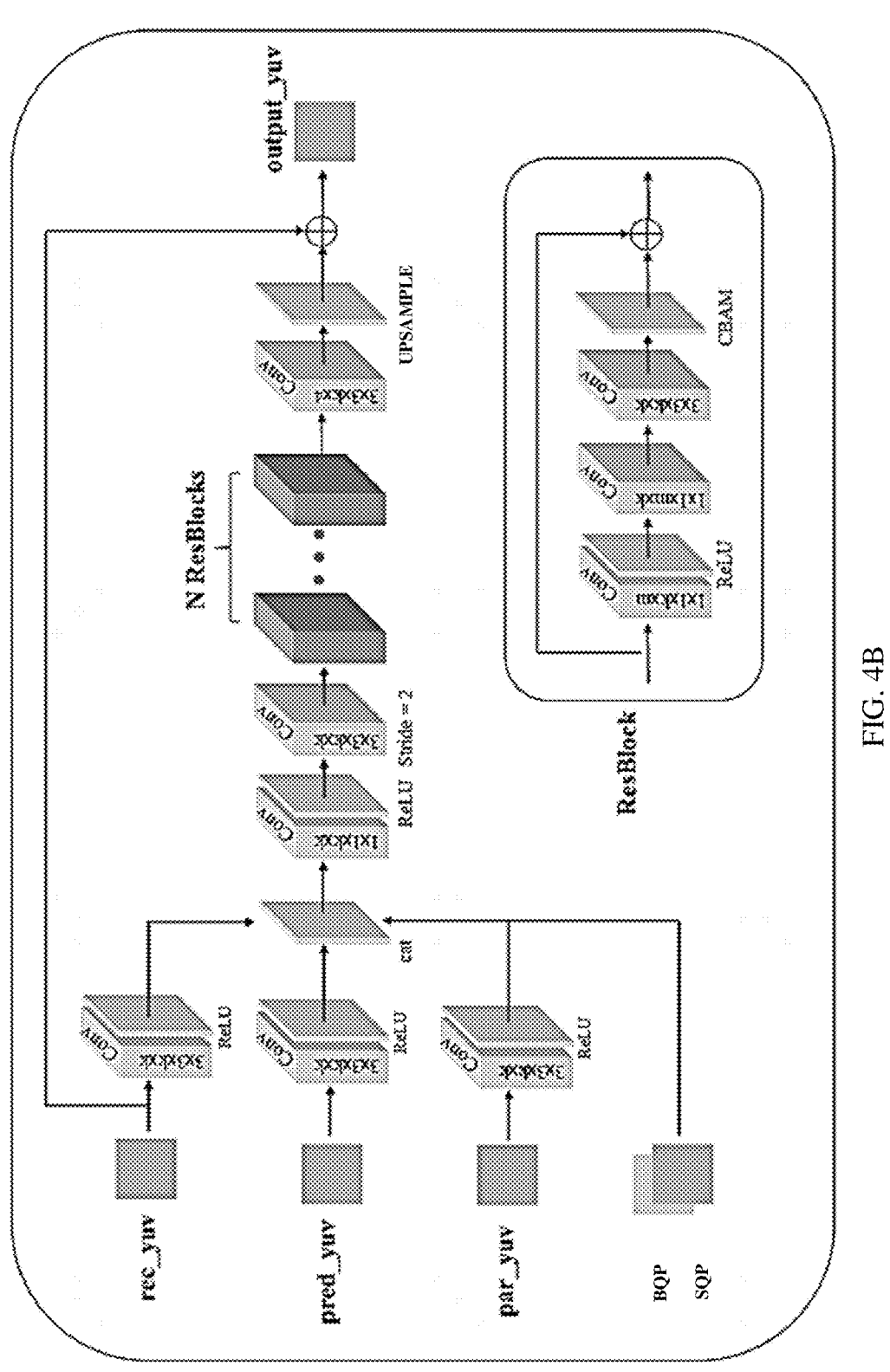
FIG. 4B is another schematic diagram of a neural network-based filter involved in embodiments of the present disclosure.

In some embodiments, further attempts are made to input more information related to the QP into the filtering network model. For example, in JVET-Y0078 illustrated in FIG. 4B, a structure of a multilayer residual network is adopted, and a slice quantization parameter (SQP) is also introduced as an input of the network in addition to the BQP.

As can be seen from the above, to improve the filtering performance of the neural network-based filter, the QP needs to be input into the neural network-based filter. At present, a method for determining the QP input into the neural network-based filter includes direct use of a preset BQP as the input or selection of one from a preset BQP candidate set as the input. However, a limited available range of the QP leads to poor accuracy of the selected input QP, which results in poor filtering effect and unsatisfactory compression quality.

To solve the technical problem above, in embodiments of the present disclosure, a second QP is predicted through a QP prediction model, a first QP is determined according to the second QP, and the reconstructed block of the current block is filtered with the neural network-based filter according to the first QP, to obtain a filtered reconstructed block. In other words, in embodiments of the present disclosure, the QP is predicted through the QP prediction model, which can expand the available range of the input QP, thereby improving the accuracy of the QP. When filtering is performed based on the accurately determined QP, the filtering effect can be improved, thereby improving the video compression performance.

The technical solutions provided in embodiments of the present disclosure are described in detail below with reference to specific embodiments.

Firstly, a decoding end is taken as an example for illustration with reference to FIG. 5.

FIG. 5 is a schematic flowchart of a video decoding method provided in embodiments of the present disclosure. Embodiments of the present disclosure are applicable to the video decoder as illustrated in FIG. 1 and FIG. 3. As illustrated in FIG. 5, the video decoding method includes the following.

S501, a first bitstream is decoded and a reconstructed block of a current block is determined.

In some embodiments, the current block is also referred to as "current CU", "current picture block", "current decoding block", "current decoding unit", "current block to-be-decoded", "current picture block to-be-decoded", etc.

In some embodiments, the current block in embodiments of the present disclosure only includes a chroma component, which can be considered as a chroma block.

In some embodiments, the current block in embodiments of the present disclosure only includes a luma component, which can be considered as a luma block.

In some embodiments, the current block includes the luma component and the chroma component.

In video decoding, the decoding end receives and decodes the bitstream to determine a block partition manner of a current CTU, and the current CTU is partitioned into blocks in the block partition manner of the current CTU to obtain at least one CU.

For a current block in the at least one CU, the decoding end can decode the bitstream to determine the reconstructed block of the current block.

A specific manner in which the decoding end decodes the bitstream to determine the reconstructed block of the current block includes two cases as follows.

Case 1, the encoding end transforms a residual value of the current block but does not perform quantization, and directly encodes a transform coefficient of the current block to obtain a bitstream. In this case, the decoding end decodes the bitstream to obtain the transform coefficient of the current block, and performs inverse transform on the transform coefficient to obtain a residual block of the current block. In addition, the current block is predicted by using a prediction method, such as inter prediction or intra prediction, to obtain a prediction block of the current block. The reconstructed block of the current block is determined according to the prediction block of the current block and the residual block of the current block. For example, a sum of the prediction block of the current block and the residual block of the current block is determined as the reconstructed block of the current block.

Case 2, the encoding end transforms the residual value of the current block and then performs quantization to obtain a quantized coefficient of the current block, and encodes the quantized coefficient of the current block to obtain a bitstream. In this case, the decoding end decodes the bitstream to obtain the quantized coefficient of the current block, preforms inverse quantization on the quantized coefficient to obtain the transform coefficient of the current block, and preforms inverse transform on the transform coefficient to obtain the residual block of the current block. In addition, the current block is predicted by using the prediction method, such as inter prediction or intra prediction, to obtain the prediction block of the current block. The reconstructed block of the current block is determined according to the prediction block of the current block and the residual block of the current block. For example, a sum of the prediction block of the current block and the residual block of the current block is determined as the reconstructed block of the current block.

S502, the bitstream is decoded and a first QP of the current block is determined.

The first QP is determined based on a second QP predicted through a QP prediction model.

In embodiments of the present disclosure, to improve the accuracy of the QP, the QP is predicted through the QP prediction model to expand an available range of the QP, thereby improving the accuracy of determining the QP. For example, the second QP is predicted through the QP prediction model, a distortion corresponding to the second QP and a distortion corresponding to a preset BQP are determined, respectively, and the first QP is determined from the predicted second QP and the preset BQP according to the distortions, thereby improving the accuracy of determining the first QP. When filtering is performed with the neural network-based filter based on the accurately determined first QP, the filtering effect can be improved, thereby improving the video compression performance.

Manners of determining the first QP of the current block at S502 include but are not limited to the following.

Manner 1, the bitstream is decoded to obtain the first QP of the current block. In other words, after the encoding end determines the first QP of the current block through calculation, the encoding end signals the first QP of the current block into the bitstream. In this way, the decoding end can obtain the first QP of the current block by decoding the bitstream, thereby reducing the workload of the decoding end and improving the decoding efficiency.

Manner 2, the decoding end determines the first QP of the current block by performing operations at S502-A1 and S502-A2 as follows.

S502-A1, the second QP of the current block is predicted through the QP prediction model.

In embodiments of the present disclosure, the second QP that conforms to feature information of the current block can be predicted through the QP prediction model based on the feature information of the current block. In this way, when picture filtering is performed based on the second QP subsequently, the picture filtering effect can be improved.

In some embodiments, the QP prediction model is trained with N preset candidate QPs as labels. In other words, with reference to the concept of classification network training, the QP prediction model is trained iteratively and its parameters are updated, with the N candidate QPs as labels and a cross-entropy loss as a loss function. In this way, the second QP of the current block can be accurately predicted through the trained QP prediction model according to picture feature information of the current block.

In some embodiments, the second QP of the current block predicted through the QP prediction model in embodiments of the present disclosure is a candidate QP with the maximum probability among the N preset candidate QPs. In other words, in embodiments of the present disclosure, selection probability of each of the N candidate QPs can be predicted through the QP prediction model, and a candidate QP with the maximum selection probability among the N preset candidate QPs is determined as the second QP of the current block.

In some embodiments, to further improve the prediction accuracy of the QP prediction model, the number of the N candidate QPs can be expanded in embodiments of the present disclosure. In this way, the second QP of the current block can be predicted through the QP prediction model with more available candidate QPs, thereby improving the prediction accuracy of the QP prediction model.

In some embodiments, in embodiments of the present disclosure, the number of the N candidate QPs is greater than the number of candidate QPs corresponding to BQPs.

Exemplarily, the number of the candidate QPs corresponding to the BQPs is usually 3, such as {BQP, BQP−5, BQP+5}, {BQP, BQP−5, BQP−10}, etc., and the number of the N candidate QPs in embodiments of the present disclosure is greater than 3.

In an example, the N candidate QPs in embodiments of the present disclosure, such as {BQP−floor(N/2), . . . , BQP+floor(N/2)}, are obtained by expanding the BQPs. Assuming that N is set to 11, the N candidate QPs in embodiments of the present disclosure are {BQP−5, BQP−4, . . . , BQP, . . . , BQP+4, BQP+5}.

In embodiments of the present disclosure, one candidate QP can be accurately selected from the N candidate QPs as the second QP of the current block through the QP prediction model. When the picture filtering is performed based on the accurate second QP, the filtering effect can be improved.

Embodiments of the present disclosure do not limit a specific network structure of the QP prediction model.

In some embodiments, the QP prediction model includes multiple convolutional layers and at least one fully connected layer. For example, the QP prediction model includes three convolutional layers and two fully connected layers. Exemplarily, the three convolutional layers are followed by the two fully connected layers.

In some embodiments, the QP prediction model further includes multiple pooling layers, where the multiple pooling layers are used to downsample feature dimensions of feature information output from the convolutional layers.

Optionally, at least one of the multiple pooling layers is a maximum pooling layer.

Optionally, at least one of the multiple pooling layers is an average pooling layer.

Embodiments of the present disclosure do not limit a specific connection manner between the multiple convolutional layers and the multiple pooling layers.

In a possible implementation, each of the multiple convolutional layers is followed by one pooling layer. In other words, in the QP prediction model, the number of the convolutional layers is the same as the number of the pooling layers, and one convolutional layer is followed by one pooling layer.

In some embodiments, the last layer of the QP prediction model is SoftMax.

Figure 6:
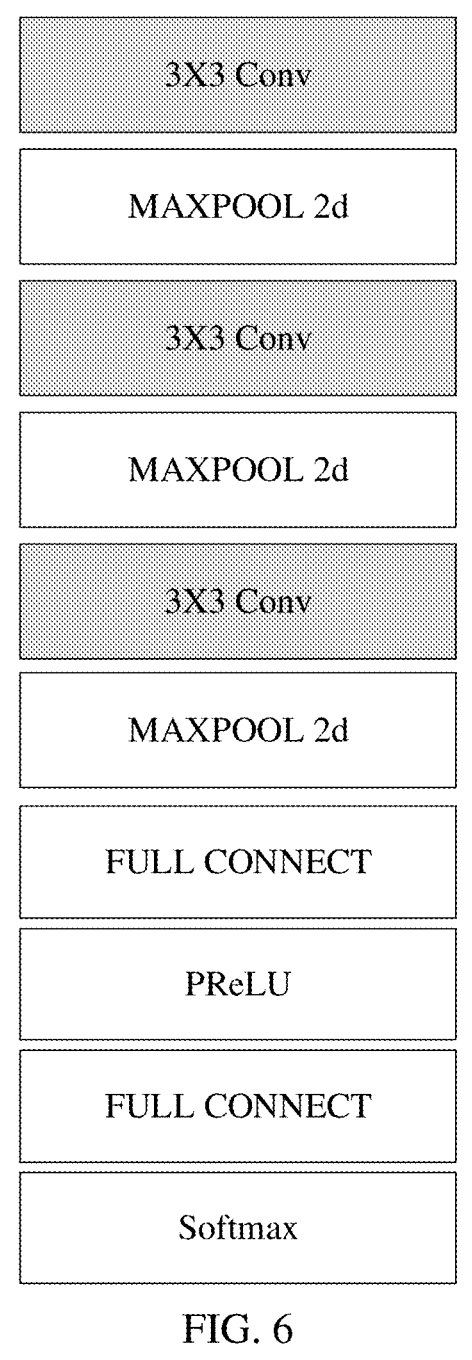

FIG. 6 is a schematic diagram of a QP prediction model provided in embodiments of the present disclosure. As illustrated in FIG. 6, the QP prediction model in embodiments of the present disclosure includes three convolutional layers (Conv), three maximum pooling layers (MaxPooling), two full connected layers (FullConnect), one non-linear activation function such as a parametric rectified linear unit (PReLU), and one SoftMax layer. Each convolutional layer is followed by one maximum pooling layer, the last maximum pooling layer is followed by one fully connected layer, the nonlinear activation function is connected between the two fully connected layers, and the last layer is the SoftMax layer. It is to be noted that FIG. 6 is only one type of the QP prediction model illustrated in embodiments of the present disclosure, and the network structure of the QP prediction model in embodiments of the present disclosure includes, but is not limited to, that illustrated in FIG. 6. In addition, the number of each type of layer in the QP prediction model includes, but is not limited to, the number illustrated in FIG. 6. For example, the QP prediction model may include multiple convolutional layers such as 2, 3, 4, 5, etc.

As illustrated in FIG. 6, the decoding end inputs the reconstructed block of the current block into the QP prediction model illustrated in FIG. 6, and in the QP prediction model, after processing of the three convolutional layers and three maximum pooling layers, the feature information of the current block is obtained. The feature information of the current block is then processed by two fully connected layers, one non-linear activation function (PRELU), and finally by the last SoftMax layer, to output the probability distribution of the N candidate QPs. The second QP of the current block is obtained according to the probability distribution.

It is to be noted that embodiments of the present disclosure do not limit the specific manner of predicting the second QP of the current block through the QP prediction model at S502-A1.

In some embodiments, the decoding end inputs the reconstructed block of the current block into the QP prediction model for QP prediction, to obtain the second QP of the current block.

In some embodiments, to improve the prediction accuracy of the QP prediction model, the decoding end inputs the reconstructed block of the current block and at least one preset third QP into the QP prediction model for QP prediction, to obtain the second QP of the current block.

Specifically, the decoding end inputs a fusion of the reconstructed block of the current block and the at least one preset third QP into the QP prediction model for QP prediction, to obtain the second QP.

Embodiments of the present disclosure do not limit a specific manner of fusing the reconstructed block of the current block and the at least one preset third QP. For example, the decoding end inputs concatenation of the reconstructed block of the current block and the at least one preset third QP into the QP prediction model for QP prediction, to obtain the second QP.

Embodiments of the present disclosure do not limit specific content of the third QP.

In some embodiments, the at least one third QP includes at least one of: a BQP, an SQP, or a QP of a reference block of the current block.

Figure 7:
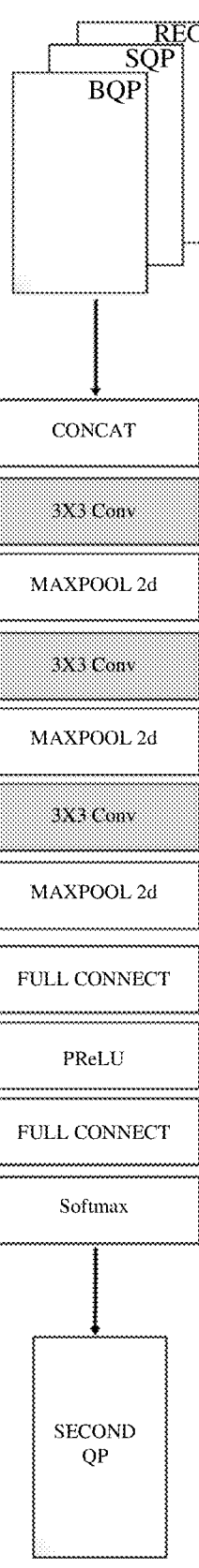
FIG. 7 is a schematic diagram of picture filtering provided in embodiments of the present disclosure.

In an example, the at least one third QP includes the BQP and the SQP. In this case, the decoding end inputs the reconstructed block of the current block, the BQP, and the SQP into the QP prediction model, and then the second QP of the current block is predicted. For example, as illustrated in FIG. 7, the reconstructed block of the current block, the BQP, and the SQP are concatenated and then input into the QP prediction model, and then the second QP of the current block is predicted.

According to the above method, after the second QP of the current block is predicted through the QP prediction model, operations at S502-A2 are performed as follows.

S502-A2, the first QP is determined according to the second QP.

In embodiments of the present disclosure, a specific implementation for determining the first QP according to the second QP includes, but is not limited to, the following.

Manner 1, since the second QP is predicted through the QP prediction model based on the reconstructed block of the current block, which conforms to the feature information of the current block, the decoding end can directly determine the predicted second QP of the current block as the first QP of the current block.

Manner 2, to further improve the accuracy of determining the first QP, the operations at S502-A2 include operations at S502-A2-1 as follows.

S502-A2-1, the first QP is determined according to the second QP and the preset BQP.

The preset BQP can be understood as a QP selected from the candidate QPs corresponding to the BQPs.

Exemplarily, the candidate QPs corresponding to the BQPs include at least one of 22, 27, 32, 37, 42, etc.

In Manner 2, the decoding end determines the first QP of the current block according to the predicted second QP of the current block and the preset BQP, thereby improving the accuracy of determining the first QP.

Embodiments of the present disclosure do not limit a specific manner of determining the first QP according to the second QP and the preset BQP at S502-A2-1.

In a possible implementation of S502-A2-1, any one of the predicted second QP of the current block and the preset BQP can be determined as the first QP of the current block. For example, the decoding end determines the minimum QP from the second QP of the current block and the preset BQP as the first QP of the current block. Alternatively, the decoding end determines a cost of the second QP of the current block and a cost of the preset BQP respectively, and determines a QP with the minimum cost from the second QP and the preset BQP as the first QP of the current block.

In another possible implementation of S502-A2-1, an average or a weighted average of the predicted second QP of the current block and the preset BQP can be determined as the first QP of the current block.

In another possible implementation of S502-A2-1, the decoding end determines the first QP of the current block from the second QP and the preset BQP according to their distortions. Specifically, the operations at S502-A2-1 include operations at S502-A2-11 to S502-A2-13 as follows.

S502-A2-11, a distortion corresponding to the second QP is determined.

S502-A2-12, a distortion corresponding to the preset BQP is determined.

S502-A2-13, the first QP is determined from the second QP and the preset BQP according to the distortion corresponding to the second QP and the distortion corresponding to the preset BQP.

In this implementation, the distortion corresponding to the second QP and the distortion corresponding to the preset BQP are determined respectively, and then the first QP is determined from the second QP and the preset BQP according to the distortion corresponding to the second QP and the distortion corresponding to the preset BQP.

Specific processes of determining the distortion corresponding to the second QP and the distortion corresponding to the preset BQP are described below. It is to be noted that a manner of determining the distortion corresponding to the second QP and a manner of determining the distortion corresponding to the preset BQP may be the same or different, which is not limited in embodiments of the present disclosure.

Embodiments of the present disclosure do not limit the manner of determining the distortion corresponding to the second QP at S502-A2-11.

In an example, the decoding end can filter the prediction block of the current block with the neural network-based filter according to the second QP, to obtain a filtered prediction block. A filtered prediction value is compared with a prediction value of the current block to obtain the distortion corresponding to the second QP. For example, a difference between the filtered prediction block and the prediction block of the current block is determined as the distortion corresponding to the second QP of the current block.

In another example, the decoding end can filter the reconstructed block of the current block with the neural network-based filter according to the second QP, to obtain a first filtered reconstructed block. The distortion corresponding to the second QP is determined according to the first filtered reconstructed block and the reconstructed block of the current block. For example, the second QP of the current block and the reconstructed block of the current block are concatenated and then input into the neural network-based filter for filtering, to obtain the first filtered reconstructed block. Then, a difference between the first filtered reconstructed block and the reconstructed block of the current block is determined as the distortion corresponding to the second QP.

Embodiments of the present disclosure do not limit the manner of determining the distortion corresponding to the preset BQP at S502-A2-12.

In an example, the decoding end can filter the prediction block of the current block with the neural network-based filter according to the preset BQP, to obtain the filtered prediction block. The filtered prediction value is compared with the prediction value of the current block to obtain the distortion corresponding to the preset BQP. For example, the difference between the filtered prediction block and the prediction block of the current block is determined as the distortion corresponding to the preset BQP of the current block.

In another example, the decoding end can filter the reconstructed block of the current block with the neural network-based filter according to the preset BQP, to obtain a second filtered reconstructed block. The distortion corresponding to the preset BQP is determined according to the second filtered reconstructed block and the reconstructed block of the current block. For example, the preset BQP of the current block and the reconstructed block of the current block are concatenated and then input into the neural network-based filter for filtering, to obtain the second filtered reconstructed block. Then, a difference between the second filtered reconstructed block and the reconstructed block of the current block is determined as the distortion corresponding to the preset BQP.

According to the above method, the distortion corresponding to the second QP and the distortion corresponding to the preset BQP are determined, and then the first QP of the current block is determined from the second QP of the current block and the preset BQP according to their distortions. For example, a QP with the minimum distortion from the second QP and the preset BQP is determined as the first QP of the current block, thereby improving the accuracy of determining the first QP. When picture filtering is performed on the reconstructed block of the current block based on the accurately determined first QP, the filtering effect of the reconstructed block can be improved.

In embodiments of the present disclosure, in addition to decoding the bitstream to obtain the first QP of the current block in Manner 1 and predicting the second QP of the current block through the QP prediction model in Manner 2, the decoding end can also determine the first QP of the current block in Manner 3 as follows.

Manner 3, the decoding end determines the first QP of the current block according to operations at S502-B1 to S502-B3 as follows.

S502-B1, the bitstream is decoded to obtain a first flag, where the first flag indicates whether the first QP of the current block is the second QP predicted through the QP prediction model.

S502-B2, when the first flag indicates that the first QP of the current block is the second QP predicted through the QP prediction model, the second QP of the current block is predicted through the QP prediction model.

S502-B3, the second QP is determined as the first QP.

In Manner 3, the encoding end can use the first flag to indicate whether the first QP of the current block is the second QP predicted through the QP prediction model. For example, when the encoding end determines that the first QP of the current block is the second QP predicted through the QP prediction model, the encoding end sets the first flag to TRUE and signals the first flag set with TRUE into the bitstream. When the encoding end determines that the first QP of the current block is not the second QP predicted through the QP prediction model, the encoding end sets the first flag to FALSE and signals the first flag set with FALSE into the bitstream. In this way, after the bitstream is received by the decoding end, the decoding end can determine the first QP of the current block by decoding the bitstream. For example, the decoding end decodes the bitstream to obtain the first flag. When the first flag indicates that the first QP of the current block is the second QP predicted through the QP prediction model, the decoding end predicts the second QP of the current block through the QP prediction model, and determines the predicted second QP as the first QP of the current block.

In some embodiments, when the decoding end decodes the bitstream and determines that the first flag indicates that the first QP of the current block is not the second QP predicted through the QP prediction model, the decoding end can determine the preset BQP as the first QP of the current block.

As can be seen from the above, in Manner 3, the first flag in block level can be used to accurately indicate whether the first QP of the current block is the second QP predicted through the QP prediction model, and thus which manner is to be used to determine the first QP can be accurately determined by the decoding end according to the first flag. For example, when the first flag indicates that the first QP of the current block is the second QP predicted through the QP prediction model, the decoding end predicts the first QP of the current block through the QP prediction model. When the first flag indicates that the first QP of the current block is not the second QP predicted through the QP prediction model, the decoding end directly determines the preset BQP as the first QP of the current block. In this way, the decoding end does not need to try to compare, which can reduce the amount of calculation for determining the first QP of the current block at the decoding end, thereby improving the filtering efficiency of the decoding end.

In some embodiments, when the value of the first flag is set to a first value, the first flag indicates that the first QP of the current block is the second QP predicted through the QP prediction model.

In some embodiments, when the value of the first flag is set to a second value, the first flag indicates that the first QP of the current block is not the second QP predicted through the QP prediction model.

Embodiments of the present disclosure do not limit specific values of the first value and the second value.

Optionally, the first value is 1.

Optionally, the second value is 0.

In an example, the first flag can be indicated by a field patch_nnqp_enable_flag[compIdx][LcuIdx], where compIdx indicates the number of three colour components, and LcuIdx indicates the number of the CTU.

In a specific example, if patch_nnqp_enable_flag[compIdx][LcuIdx] is 1, the first flag indicates that the first QP of the current block is the second QP predicted through the QP prediction model. In this case, the decoding end predicts the second QP of the current block through the QP prediction model.

For example, when patch_nnqp_enable_flag[compIdx][LcuIdx]=1, the decoding end inputs the reconstructed block of the current block into the QP prediction model for QP prediction, to obtain the second QP of the current block.

For another example, when patch_nnqp_enable_flag[compIdx][LcuIdx]=1, the decoding end inputs the reconstructed block of the current block and the at least one preset third QP into the QP prediction model for QP prediction, to obtain the second QP of the current block. In a possible implementation, the decoding end inputs concatenation of the reconstructed block of the current block and the at least one preset third QP into the QP prediction model for QP prediction to obtain the second QP, and determines the second QP as the first QP of the current block.

Embodiments of the present disclosure do not limit the specific content of the at least one third QP.

Optionally, the at least one third QP includes at least one of: a BQP, an SQP, or a QP of the reference block of the current block. Exemplarily, the at least one third QP includes the BQP and the SQP. In this case, the decoding end inputs concatenation of the reconstructed block of the current block, the BQP, and the SQP into the QP prediction model for QP prediction, to obtain the second QP.

In another specific example, if patch_nnqp_enable_flag[compIdx][LcuIdx]=0, the first flag indicates that the first QP of the current block is not the second QP predicted through the QP prediction model. In this case, the decoding end determines the preset BQP as the first QP of the current block.

In Manner 3, the decoding end determines the first QP of the current block according to the first flag in block level.

In some embodiments, a second flag in picture level is further contained in the bitstream, where the second flag indicates whether a first QP of at least one block in a current picture is the second QP predicted through the QP prediction model. In other words, when the encoding end determines a first QP of each coding block in the current picture, the encoding end determines both the first flag and the second flag. Specifically, when the encoding end determines the first QP of each coding block in the current picture, for each coding block, if the encoding end determines that the first QP of the coding block is the second QP predicted through the QP prediction model, the encoding end sets a first flag corresponding to the coding block to TRUE, and if the encoding end determines that the first QP of the coding block is not the second QP predicted through the QP prediction model, the encoding end sets the first flag corresponding to the coding block to FALSE. According to this method, the encoding end can determine the first flag of each coding block in the current picture. Further, the encoding end determines the second flag of the current picture according to the first flag of each coding block in the current picture. Specifically, if the first flag of each coding block (i.e., all coding blocks) in the current picture is FALSE, for example, the first flag of each coding block in the current picture is 0, it is indicated that the first QP of each coding block in the current picture is not the second QP predicted through the QP prediction model. In this case, the encoding end sets the second flag of the current picture to FALSE, for example, sets to 0, and signals the second flag set with FALSE into the bitstream. If there is a first flag of at least one coding block in the current picture that is TRUE, for example, the first flag of the at least one coding block in the current picture is 1, it is indicated that the first QP of the at least one coding block in the current picture is the second QP predicted through the QP prediction model. In this case, the encoding end sets the second flag of the current picture to TRUE, for example, sets to 1, and signals the second flag set with TRUE into the bitstream. In this way, before the decoding end decodes the first flag from the bitstream, the decoding end first decodes the bitstream to obtain the second flag. When the second flag indicates that the first QP of the at least one block in the current picture is the second QP predicted through the QP prediction model, the decoding end continues to decode the bitstream to obtain the first flag, and determines the first QP of the current block according to the first flag.

In some embodiments, when the decoded second flag indicates that the first QP of the current picture is not the second QP predicted through the QP prediction model, i.e., when the second flag indicates that the first QP of each block in the current picture is not the second QP predicted through the QP prediction model, the decoding end will not decode the first flag from the bitstream, but determines the preset BQP as the first QP of the current block.

In some embodiments, when the value of the second flag is set to a third value, the second flag indicates that the first QP of the at least one block in the current picture is the second QP predicted through the QP prediction model.

In some embodiments, when the value of the first flag is set to a fourth value, the second flag indicates that the first QP of the current picture is not the second QP predicted through the QP prediction model.

Embodiments of the present disclosure do not limit specific values of the third value and the fourth value.

Optionally, the third value is 1.

Optionally, the fourth value is 0.

In an example, the second flag can be indicated by a field picture_nnqp_enable_flag[compIdx], where compIdx indicates the number of the three colour components.

In a specific example, if picture_nnqp_enable_flag[compIdx] is 1, the second flag indicates that the first QP of the at least one block in the current picture is the second QP predicted through the QP prediction model. In this case, the decoding end continues to decode the bitstream to obtain the first flag, and determines the first QP of the current block according to the first flag.

In another specific example, if picture_nnqp_enable_flag[compIdx] is 0, the second flag indicates that the first QP of the current picture is not the second QP predicted through the QP prediction model. In this case, the decoding end will not decode the bitstream to obtain the first flag, but directly determines the preset BQP as the first QP of the current block.

In some embodiments, a third flag in picture level is further contained in the bitstream, where the third flag indicates whether the QP prediction model is allowed to be used for a current sequence for QP prediction. In other words, in embodiments of the present disclosure, when the encoding end determines that the QP prediction model is allowed to be used for the current sequence for QP prediction, the encoding end sets the third flag to TRUE, and signals the third flag set with TRUE into the bitstream. If the encoding end determines that the QP prediction model is not allowed to be used for the current sequence for QP prediction, the encoding end sets the third flag to FALSE, and signals the third flag set with FALSE into the bitstream. Correspondingly, before the decoding end decodes the bitstream to obtain the second flag, the decoding end first decodes the bitstream to obtain the third flag, and determines, according to the third flag, whether the QP prediction model is allowed to be used for the current sequence for QP prediction. When the third flag indicates that the QP prediction model is allowed to be used for the current sequence for QP prediction, the decoding end continues to decode the bitstream to obtain the second flag.

In some embodiments, when the third flag indicates that the QP prediction model is not allowed to be used for the current sequence for QP prediction, the decoding end does not use the QP prediction model for QP prediction, i.e., the decoding end will not decode the bitstream to obtain the second flag or the first flag, but determines the first QP of the current block in other manners. For example, a preset BQP is determined as the first QP of the current block.

In some embodiments, when the value of the third flag is set to a fifth value, the third flag indicates that the QP prediction model is allowed to be used for the current sequence for QP prediction.

In some embodiments, when the value of the third flag is set to a sixth value, the third flag indicates that the QP prediction model is not allowed to be used for the current sequence for QP prediction.

Embodiments of the present disclosure do not limit specific values of the fifth value and the sixth value.

Optionally, the fifth value is 1.

Optionally, the sixth value is 0.

In an example, the third flag can be indicated by a field nnqp_enable_flag.

In a specific example, if nnqp_enable_flag is 1, the third flag indicates that the QP prediction model is allowed to be used for the current sequence for QP prediction. In this case, the decoding end continues to decode the bitstream to obtain the second flag and/or the first flag. In another specific example, if nnqp_enable_flag is 0, the third flag indicates that the QP prediction model is not allowed to be used for the current sequence for QP prediction. In this case, the decoding end will not decode the bitstream to obtain the second flag and/or the first flag, but determines the first QP of the current block in other manners. For example, the preset BQP is directly determined as the first QP of the current block.

Embodiments of the present disclosure do not limit a specific position of the third flag in the bitstream.

In an example, the third flag is in a sequence header. In this case, the sequence header containing the third flag is defined as illustrated in Table 1.

TABLE 1

|  | Descriptor |
| --- | --- |
| sequence_header( ) { | |
| ... ... | |
| nnqp_enable_flag | u(1) |
| ... ... | |
| } | | nnqp_enable_flag is the third flag.

Embodiments of the present disclosure do not limit a specific position of the second flag in the bitstream.

In an example, the second flag is in a picture header. In this case, the picture header containing the second flag is defined as illustrated in Table 2.

TABLE 2

|  | Descriptor |
| --- | --- |
| picture_header( ) { | |
| ... ... | ... ... |
| if(nnqp_enable_flag) { | |
| for (compIdx=0; compIdx<3; compIdx++) { | |
| picture_nnqp_enable_flag[compIdx] | u(1) |
| } | |
| } | |
| ... ... | ... ... |

When the third flag nnqp_enable_flag is 1, the second flag picture_nnqp_enable_flag[compIdx] is defined.

Embodiments of the present disclosure do not limit a specific position of the first flag in the bitstream.

In an example, the first flag is in a picture block. In this case, the picture block containing the first flag is defined as illustrated in Table 3.

TABLE 3

|  | Descriptor |
|---|---|
| patch( ) { | |
| ... ... | ... ... |
| if (nnqp_enable_flag) { | |
| for (compIdx=0; compIdx<3; compIdx++) { | u(1) |
| if (picture_nnqp_enable_flag[compIdx]){ | |
| patch_nnqp_enable_flag[compIdx][LcuIdx] | ae(v) |
| } | |
| } | |
| } | |
| ... ... | ... ... |

When the third flag nnqp_enable_flag is 1 and the second flag picture_nnqp_enable_flag[compIdx] is 1, the first flag patch_nnqp_enable_flag[compIdx][LcuIdx] is defined.

In embodiments of the present disclosure, after the decoding end determines the first QP of the current block according to the operations at S502, the decoding end performs operations at S503 as follows.

S503, the reconstructed block of the current block is filtered with the neural network-based filter according to the first QP, to obtain a filtered reconstructed block.

As can be seen from the above, in embodiments of the present disclosure, the first QP is determined based on the second QP predicted through the QP prediction model. In this way, compared with attempting to determine the first QP from multiple candidate QPs, the QP is predicted through the QP prediction model in embodiment of the present embodiment, which not only reduces the complexity of determining the QP and improves the speed of determining the QP, improving the coding efficiency, but also expands the available range of the QP and improves the accuracy of the QP. When filtering is performed based on the accurately determined QP, the filtering effect can be improved, thereby improving the video compression performance.

After the first QP of the current block is determined by the decoding end according to the above method, the decoding end filters the reconstructed block of the current block through the neural network-based filter to obtain the filtered reconstructed block. The determined first QP of the current block in embodiments of the present disclosure is predicted based on feature information of the reconstructed block, and thus when the reconstructed block is filtered based on the first QP, the filtering effect of the reconstructed block can be improved.

Embodiments of the present disclosure do not limit the specific implementation of the operations at S503.

In some embodiments, the decoding end inputs the reconstructed value of the current block and the determined first QP of the current block into the neural network-based filter for filtering, to obtain the filtered reconstructed block. For example, the decoding end inputs concatenation of the reconstructed value of the current block and the first QP of the current block into the neural network-based filter for filtering, to obtain the filtered reconstructed block.

In some embodiments, to further improve the filtering effect of the reconstructed block, the decoding end can input other QPs associated with the current block, in addition to the first QP of the current block and the reconstructed block of the current block, into the neural network-based filter. Exemplarily, the decoding end can also input the reconstructed value of the current block, the determined first QP of the current block, as well as an SQP of the current slice containing the current block, and/or a BQP of the reference block of the current block into the neural network-based filter for filtering, to obtain the filtered reconstructed block.

In some embodiments, the reconstructed value of the current block is an unfiltered reconstructed block. For example, the reconstructed block of the current block is a picture block obtained by adding the residual block of the current block to the prediction block of the current block.

In some embodiments, before the decoding end filters the reconstructed value of the current block with the neural network-based filter, the decoding end can filter the reconstructed value of the current block in other filtering manners. In this case, the operations at S503 include the following. Loop filtering is performed on the reconstructed block of the current block to obtain a loop-filtered reconstructed block. The loop-filtered reconstructed block is filtered with the neural network-based filter according to the first QP, to obtain the filtered reconstructed block. For example, loop filtering is performed on the reconstructed block of the current block with DB and/or SAO, to obtain the loop-filtered reconstructed block. Then, the first QP and the loop-filtered reconstructed block are concatenated and then input into the neural network-based filter for filtering the loop-filtered reconstructed block, to obtain the filtered reconstructed block.

Figure 8:
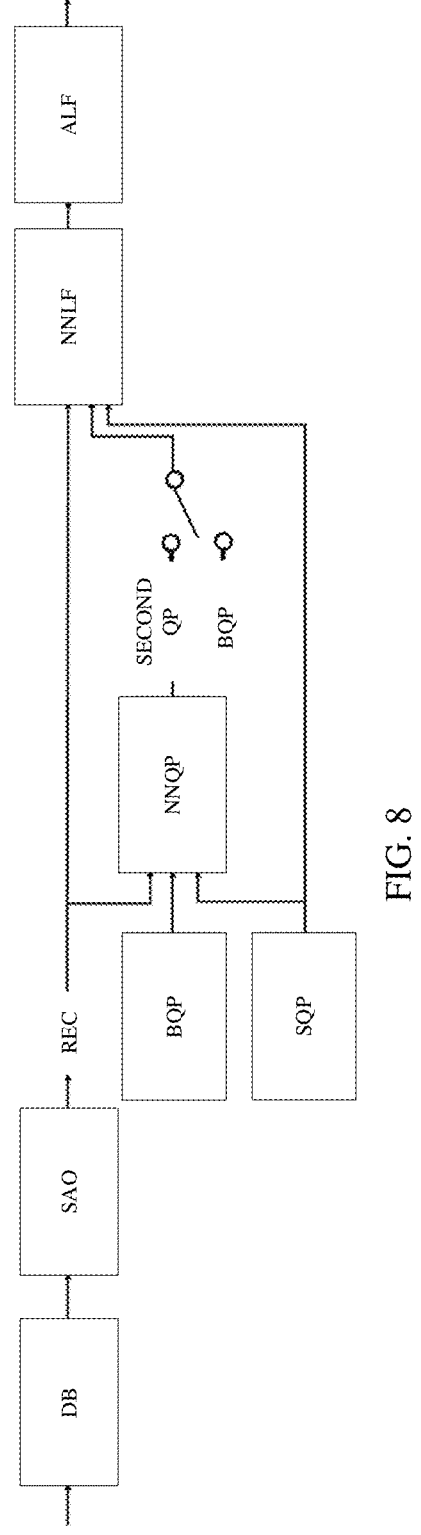
FIG. 8 is a schematic diagram of loop filtering involved in embodiments of the present disclosure.

In a possible implementation, as illustrated in FIG. 8, the QP prediction model in embodiments of the present disclosure can be between the SAO and the neural network-based filter, such as a neural network-based loop filter (NNLF). Specifically, as illustrated in FIG. 8, the reconstructed block of the current block is filtered with the DB and the SAO to obtain the loop-filtered reconstructed block. Then, the loop-filtered reconstructed block, the base quantized coefficient, and the slice quantization coefficient are input into the QP prediction model, such as a neural network-based quantization parameter (NNQP), and the second QP of the current block is predicted through the NNQP. According to the above method, the first QP of the current block is determined from the second QP and the preset BQP. Then, the loop-filtered reconstructed block is filtered with the NNLF according to the determined first QP, to obtain the filtered reconstructed block. Optionally, the filtered reconstructed block can also be filtered again with the ALF.

The video decoding method provided in embodiments of the present disclosure includes the following. The decoding end decodes the bitstream and determines the reconstructed block of the current block. The decoding end decodes the bitstream and determines the first QP of the current block, where the first QP is determined based on the second QP predicted through the QP prediction model. The decoding end filters the reconstructed block of the current block with the neural network-based filter according to the first QP, to obtain the filtered reconstructed block. In other words, in embodiments of the present disclosure, the QP is predicted through the QP prediction model, which can expand the available range of the QP, thereby improving the accuracy of the QP. When filtering is performed based on the accurately determined QP, the filtering effect can be improved, thereby improving the video compression performance.

Figure 9:
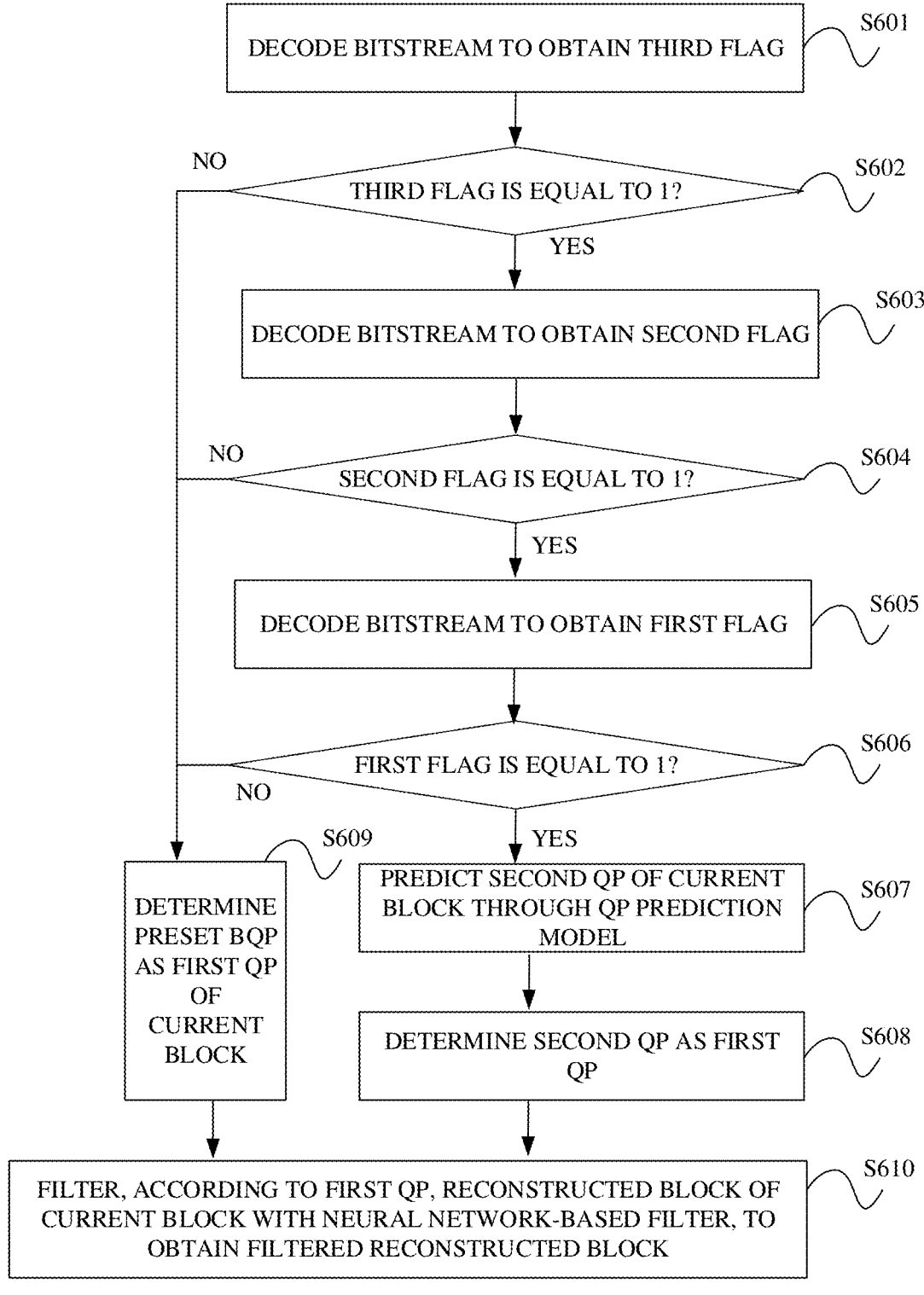
FIG. 9 is a schematic flowchart of video decoding provided in an embodiment of the present disclosure.

FIG. 9 is a schematic flowchart of video decoding provided in an embodiment of the present disclosure. A video decoding method illustrated in FIG. 9 can be considered as a specific and feasible embodiment of the video decoding method illustrated in FIG. 5. As illustrated in FIG. 9, the video decoding method provided in embodiments of the present disclosure includes the following.

S601, a bitstream is decoded to obtain a third flag.

The third flag indicates whether a QP prediction model is allowed to be used for a current sequence for QP prediction.

S602, whether the third flag is equal to 1 is determined.

In some embodiments, if the third flag=1, the third flag indicates that the QP prediction model is enabled for the current sequence for QP prediction. In this case, operations at S603 are performed.

In some embodiments, if the third flag=0, the third flag indicates that the QP prediction model is not enabled for the current sequence for QP prediction. In this case, operations at S609 are performed.

S603, the bitstream is decoded to obtain a second flag.

That is, in embodiments of the present disclosure, when the third flag indicates that the QP prediction model is allowed to be used for the current sequence for QP prediction, the decoding end continues to decode the bitstream to obtain the second flag, where the second flag indicates whether a first QP of at least one block in a current picture is a second QP predicted through the QP prediction model.

S604, whether the second flag is equal to 1 is determined.

In some embodiments, if the second flag=1, the second flag indicates that the first QP of the at least one block in the current picture is the second QP predicted through the QP prediction model, and operations at S605 are performed.

In some embodiments, if the second flag=0, the second flag indicates that the first QP of the current picture is not the second QP predicted through the QP prediction model, and the operations at S609 are performed.

S605, the bitstream is decoded to obtain a first flag.

That is, in embodiments of the present disclosure, when the second flag indicates that the first QP of the at least one block in the current picture is the second QP predicted through the QP prediction model, the bitstream is decoded to obtain the first flag, where the first flag indicates whether a first QP of a current block is the second QP predicted through the QP prediction model.

S606, whether the first flag is equal to 1 is determined.

In some embodiments, if the first flag=1, the first flag indicates that the first QP of the current block is the second QP predicted through the QP prediction model. In this case, operations at S607 are performed.

In some embodiments, if the first flag=0, the first flag indicates that the first QP of the current block is not the second QP predicted through the QP prediction model. In this case, the operations at S609 are performed.

S607, the second QP of the current block is predicted through the QP prediction model.

For example, a reconstructed block of the current block and at least one preset third QP are input into the QP prediction model for QP prediction to obtain the second QP.

In an example, the reconstructed block of the current block and the at least one preset third QP are concatenated and then input into the QP prediction model for QP prediction, to obtain the second QP.

Optionally, the at least one preset third QP includes at least one of: a BQP, an SQP, and a QP of a reference block of the current block.

S608, the second QP is determined as the first QP.

After the operations at S608 are performed, operations at S610 are performed.

S609, a preset BQP is determined as the first QP of the current block.

After the operations at S609 are performed, operations at S610 are performed.

S610, the reconstructed block of the current block is filtered with a neural network-based filter according to the first QP, to obtain a filtered reconstructed block.

In some embodiments, loop filtering is performed on the reconstructed block of the current block to obtain a loop-filtered reconstructed block. The loop-filtered reconstructed block is filtered with the neural network-based filter according to the first QP, to obtain the filtered reconstructed block.

In embodiments of the present disclosure, which manner is to be used to determine the first QP can be accurately determined by the decoding end by decoding the first flag, the second flag, and the third flag. For example, when the decoding end determines that the first QP of the current block is the second QP predicted through the QP prediction model, the decoding end predicts the first QP of the current block through the QP prediction model. When the decoding end determines that the first QP of the current block is not the second QP predicted through the QP prediction model, the decoding end directly determines the preset BQP as the first QP of the current block. In this way, the accuracy and the amount of calculation for determining the first QP of the current block at the decoding end are reduced, thereby improving the filtering efficiency of the decoding end.

The video decoding method involved in embodiments of the present disclosure is described above. On this basis, a video encoding method involved in the present disclosure will be described below with respect to the encoding end.

Figure 10:
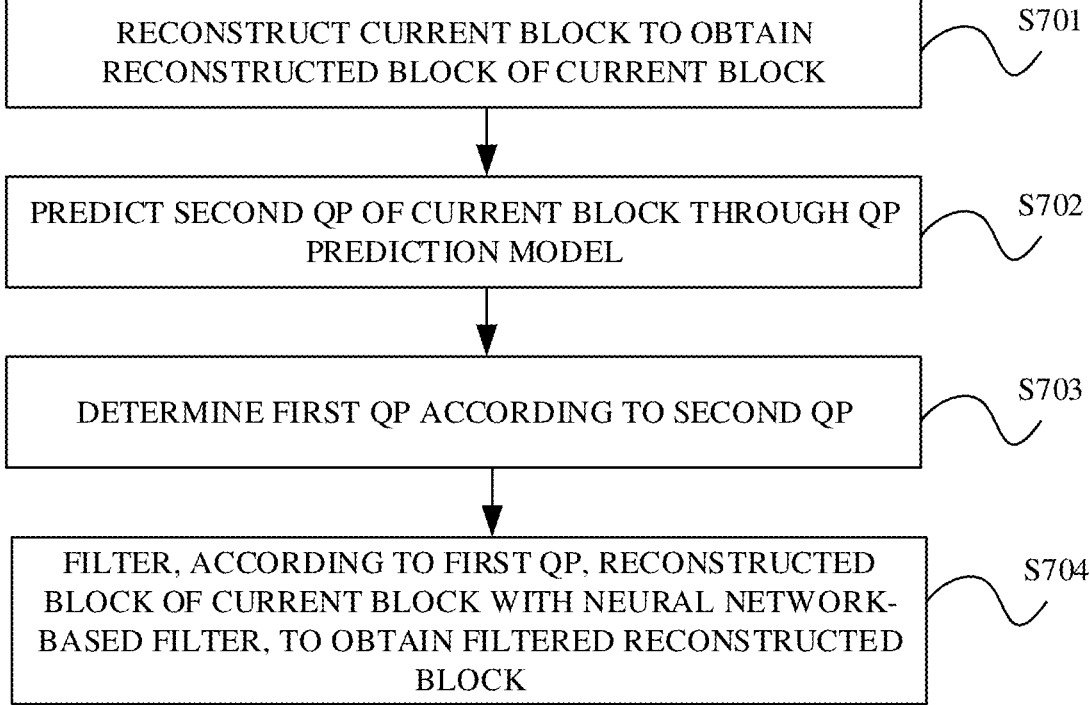
FIG. 10 is a schematic flowchart of a video encoding method provided in embodiments of the present disclosure.

FIG. 10 is a schematic flowchart of a video encoding method provided in embodiments of the present disclosure. In embodiments of the present disclosure, the video encoding method can be implemented by the encoder illustrated in FIG. 1 or FIG. 2.

As illustrated in FIG. 10, the video encoding method in embodiments of the present disclosure includes the following.

S701, a current block is reconstructed to obtain a reconstructed block of the current block.

In some embodiments, the current block is also referred to as "current CU", "current picture block", "current decoding block", "current decoding unit", "current block to-be-decoded", "current picture block to-be-decoded", etc.

In some embodiments, the current block in embodiments of the present disclosure only includes a chroma component, which can be considered as a chroma block.

In some embodiments, the current block in embodiments of the present disclosure only includes a luma component, which can be considered as a luma block.

In some embodiments, the current block includes the luma component and the chroma component.

During video encoding, a current picture is partitioned into blocks to obtain multiple coding blocks. The current block in the multiple coding blocks is predicted by using a prediction method such as inter prediction or intra prediction, to obtain a prediction block of the current block. A residual block of the current block is determined according to the prediction block of the current block and the current block. For example, a difference obtained by subtracting the prediction block from the current block is determined as the residual block of the current block. The residual block of the current block is transformed to obtain a transform coefficient of the current block.

In some embodiments, the encoding end can skip quantization and directly encode the transform coefficient, to obtain a bitstream.

In some embodiments, the encoding end quantizes the transform coefficient to obtain a quantized coefficient of the current block, and then encodes the quantized coefficient to obtain a bitstream.

The encoding end further performs decoding in addition to forming the bitstream. In some embodiments, the encoding end performs inverse transform on the transform coefficient of the current block to obtain the residual block of the current block, and adds the residual block to the prediction block to obtain the reconstructed block of the current block.

In some embodiments, the encoding end performs inverse quantization on the quantized coefficient of the current block to obtain the transform coefficient of the current block, performs inverse transform on the transform coefficient of the current block to obtain the residual block of the current block, and adds the residual block to the prediction block to obtain the reconstructed block of the current block.

S702, a second QP of the current block is predicted through a QP prediction model.

In embodiments of the present disclosure, to improve the accuracy of the QP, the QP is predicted through the QP prediction model to expand an available range of the QP, thereby improving the accuracy of determining the QP.

In embodiments of the present disclosure, the second QP that conforms to feature information of the current block can be predicted based on the feature information of the current block through the QP prediction model. In this way, when picture filtering is performed based on the second QP subsequently, the picture filtering effect can be improved.

In some embodiments, the QP prediction model is trained with N preset candidate QPs as labels. In other words, with reference to the concept of classification network training, the QP prediction model is trained iteratively and its parameters are updated, with the N candidate QPs as labels and a cross-entropy loss as a loss function. In this way, the second QP of the current block can be accurately predicted through the trained QP prediction model according to picture feature information of the current block.

In some embodiments, the second QP of the current block predicted through the QP prediction model in embodiments of the present disclosure is a candidate QP with the maximum probability among the N preset candidate QPs. In other words, in embodiments of the present disclosure, selection probability of each of the N candidate QPs can be predicted through the QP prediction model, and a candidate QP with the maximum selection probability among the N preset candidate QPs is determined as the second QP of the current block.

In some embodiments, to further improve the prediction accuracy of the QP prediction model, the number of the N candidate QPs can be expanded in embodiments of the present disclosure. In this way, the second QP of the current block can be predicted through the QP prediction model with more available candidate QPs, thereby improving the prediction accuracy of the QP prediction model.

In some embodiments, in embodiments of the present disclosure, the number of the N candidate QPs is greater than the number of candidate QPs corresponding to BQPs.

Exemplarily, the number of the candidate QPs corresponding to the BQPs is usually 3, such as {BQP, BQP–5, BQP+5}, {BQP, BQP–5, BQP–10}, etc., and the number of the N candidate QPs in embodiments of the present disclosure is greater than 3.

In an example, the N candidate QPs in embodiments of the present disclosure, such as {BQP-floor(N/2), . . . , BQP+floor(N/2)}, are obtained by expanding the BQPs. Assuming that N is set to 11, the N candidate QPs in embodiments of the present disclosure are {BQP–5, BQP–4, . . . , BQP, . . . , BQP+4, BQP+5}.

In embodiments of the present disclosure, one candidate QP can be accurately selected from the N candidate QPs as the second QP of the current block through the QP prediction model. When the picture filtering is performed based on the accurate second QP, the filtering effect can be improved.

Embodiments of the present disclosure do not limit a specific network structure of the QP prediction model.

In some embodiments, the QP prediction model includes multiple convolutional layers and at least one fully connected layer. For example, the QP prediction model includes three convolutional layers and two fully connected layers. Exemplarily, the three convolutional layers are followed by the two fully connected layers.

In some embodiments, the QP prediction model further includes multiple pooling layers, where the multiple pooling layers are used to downsample feature dimensions of feature information output from the convolutional layers.

Optionally, at least one of the multiple pooling layers is a maximum pooling layer.

Optionally, at least one of the multiple pooling layers is an average pooling layer.

Embodiments of the present disclosure do not limit a specific connection manner between the multiple convolutional layers and the multiple pooling layers.

In a possible implementation, each of the multiple convolutional layers is followed by one pooling layer. In other words, in the QP prediction model, the number of the convolutional layers is the same as the number of the pooling layers, and one convolutional layer is followed by one pooling layer.

In some embodiments, the last layer of the QP prediction model is SoftMax.

FIG. 6 is a schematic diagram of a QP prediction model provided in embodiments of the present disclosure. As illustrated in FIG. 6, the QP prediction model in embodiments of the present disclosure includes three convolutional layers (Conv), three maximum pooling layers (MaxPooling), two full connected layers (FullConnect), one non-linear activation function such as a PReLU, and one SoftMax layer. Each convolutional layer is followed by one maximum pooling layer, the last maximum pooling layer is followed by one fully connected layer, the nonlinear activation function (PReLU) is connected between the two fully connected layers, and the last layer is the SoftMax layer. It is to be noted that FIG. 6 is only one type of the QP prediction model illustrated in embodiments of the present disclosure, and the network structure of the QP prediction model in embodiments of the present disclosure includes, but is not limited to, that illustrated in FIG. 6. In addition, the number of each type of layer in the QP prediction model includes, but is not limited to, the number illustrated in FIG. 6. For example, the QP prediction model may include multiple convolutional layers such as 2, 3, 4, 5, etc. As illustrated in FIG. 6, the encoding end inputs the reconstructed block of the current block into the QP prediction model illustrated in FIG. 6, and in the QP prediction model, after processing of the three convolutional layers and three maximum pooling layers, the feature information of the current block is obtained. The feature information of the current block is then processed by two fully connected layers, one non-linear activation function (PReLU), and finally by the last SoftMax layer, to output the probability distribution of the N candidate QPs. The second QP of the current block is obtained according to the probability distribution.

It is to be noted that embodiments of the present disclosure do not limit the specific manner of predicting the second QP of the current block through the QP prediction model at S702.

In some embodiments, the encoding end inputs the reconstructed block of the current block into the QP prediction model for QP prediction, to obtain the second QP of the current block.

In some embodiments, to improve the prediction accuracy of the QP prediction model, the encoding end inputs the reconstructed block of the current block and at least one preset third QP into the QP prediction model for QP prediction, to obtain the second QP of the current block.

Specifically, the encoding end inputs a fusion of the reconstructed block of the current block and the at least one preset third QP into the QP prediction model for QP prediction, to obtain the second QP.

Embodiments of the present disclosure do not limit a specific manner of fusing the reconstructed block of the current block and the at least one preset third QP. For example, the encoding end inputs concatenation of the reconstructed block of the current block and the at least one preset third QP into the QP prediction model for QP prediction, to obtain the second QP.

Embodiments of the present disclosure do not limit specific content of the third QP.

In some embodiments, the at least one third QP includes at least one of: a BQP, an SQP, or a QP of a reference block of the current block.

In an example, the at least one third QP includes the BQP and the SQP. In this case, the encoding end inputs the reconstructed block of the current block, the BQP, and the SQP into the QP prediction model, and then the second QP of the current block is predicted. For example, as illustrated in FIG. 7, the reconstructed block of the current block, the BQP, and the SQP are concatenated and then input into the QP prediction model, and then the second QP of the current block is predicted.

According to the above method, after the second QP of the current block is predicted through the QP prediction model, operations at S703 are performed as follows.

S703, the first QP is determined according to the second QP.

In embodiments of the present disclosure, a specific implementation for determining the first QP according to the second QP includes, but is not limited to, the following.

Manner 1, since the second QP is predicted through the QP prediction model based on the reconstructed block of the current block, which conforms to the feature information of the current block, the encoding end can directly determine the predicted second QP of the current block as the first QP of the current block.

Manner 2, to further improve the accuracy of determining the first QP, the operations at S703 include operations at S703-A as follows.

S703-A, the first QP is determined according to the second QP and the preset BQP.

The preset BQP can be understood as a QP selected from the candidate QPs corresponding to the BQPs.

Exemplarily, the candidate QPs corresponding to the BQPs include at least one of 22, 27, 32, 37, 42, etc.

In Manner 2, the encoding end determines the first QP of the current block according to the predicted second QP of the current block and the preset BQP, thereby improving the accuracy of determining the first QP.

Embodiments of the present disclosure do not limit a specific manner of determining the first QP according to the second QP and the preset BQP at S703-A.

In a possible implementation of S703-A, any one of the predicted second QP of the current block and the preset BQP can be determined as the first QP of the current block. For example, the encoding end determines the minimum QP from the second QP of the current block and the preset BQP as the first QP of the current block. Alternatively, the encoding end determines a cost of the second QP of the current block and a cost of the preset BQP respectively, and determines a QP with the minimum cost from the second QP and the preset BQP as the first QP of the current block.

In another possible implementation of S703-A, an average or a weighted average of the predicted second QP of the current block and the preset BQP can be determined as the first QP of the current block.

In another possible implementation of S703-A, the encoding end determines the first QP of the current block from the second QP and the preset BQP according to their distortions. Specifically, the operations at S703-A include operations at S703-A1 to S703-A3 as follows.

S703-A1, a distortion corresponding to the second QP is determined.

S703-A2, a distortion corresponding to the preset BQP is determined.

S703-A3, the first QP is determined from the second QP and the preset BQP according to the distortion corresponding to the second QP and the distortion corresponding to the preset BQP.

In this implementation, the distortion corresponding to the second QP and the distortion corresponding to the preset BQP are determined respectively, and then the first QP is determined from the second QP and the preset BQP according to the distortion corresponding to the second QP and the distortion corresponding to the preset BQP.

Specific processes of determining the distortion corresponding to the second QP and the distortion corresponding to the preset BQP are described below. It is to be noted that a manner of determining the distortion corresponding to the second QP and a manner of determining the distortion corresponding to the preset BQP may be the same or different, which is not limited in embodiments of the present disclosure.

Embodiments of the present disclosure do not limit the manner of determining the distortion corresponding to the second QP at S703-A1.

In an example, the encoding end can filter the prediction block of the current block with the neural network-based filter according to the second QP, to obtain a filtered prediction block. A filtered prediction value is compared with a prediction value of the current block to obtain the distortion corresponding to the second QP. For example, a difference between the filtered prediction block and the prediction block of the current block is determined as the distortion corresponding to the second QP of the current block.

In another example, the encoding end can filter the reconstructed block of the current block with the neural network-based filter according to the second QP, to obtain a first filtered reconstructed block. The distortion corresponding to the second QP is determined according to the first filtered reconstructed block and the reconstructed block of the current block. For example, the second QP of the current block and the reconstructed block of the current block are concatenated and then input into the neural network-based filter for filtering, to obtain the first filtered reconstructed block. Then, a difference between the first filtered reconstructed block and the reconstructed block of the current block is determined as the distortion corresponding to the second QP.

Embodiments of the present disclosure do not limit the manner of determining the distortion corresponding to the preset BQP at S703-A2.

In an example, the encoding end can filter the prediction block of the current block with the neural network-based filter according to the preset BQP, to obtain the filtered prediction block. The filtered prediction value is compared with the prediction value of the current block to obtain the distortion corresponding to the preset BQP. For example, the difference between the filtered prediction block and the prediction block of the current block is determined as the distortion corresponding to the preset BQP of the current block.

In another example, the encoding end can filter the reconstructed block of the current block with the neural network-based filter according to the preset BQP, to obtain a second filtered reconstructed block. The distortion corresponding to the preset BQP is determined according to the second filtered reconstructed block and the reconstructed block of the current block. For example, the preset BQP of the current block and the reconstructed block of the current block are concatenated and then input into the neural network-based filter for filtering, to obtain the second filtered reconstructed block. Then, a difference between the second filtered reconstructed block and the reconstructed block of the current block is determined as the distortion corresponding to the preset BQP.

According to the above method, the distortion corresponding to the second QP and the distortion corresponding to the preset BQP are determined, and then the first QP of the current block is determined from the second QP of the current block and the preset BQP according to their distortions. For example, a QP with the minimum distortion from the second QP and the preset BQP is determined as the first QP of the current block, thereby improving the accuracy of determining the first QP. When picture filtering is performed on the reconstructed block of the current block based on the accurately determined first QP, the filtering effect of the reconstructed block can be improved.

In embodiments of the present disclosure, the encoding end determines the first QP of the current block according to the second QP predicted through the QP prediction model, thereby rapidly and accurately determining the first QP.

In some embodiments, after the encoding end determines the first QP of the current block according to the above method, operations at Step 1 are further included in embodiments of the present disclosure as follows.

Step 1, a first flag is determined according to the first QP, where the first flag indicates whether the first QP of the current block is the second QP predicted through the QP prediction model.

In some embodiments, when the encoding end determines that the first QP of the current block is the second QP predicted through the QP prediction model, the encoding end sets the first flag to TRUE and signals the first flag set with TRUE into the bitstream.

In some embodiments, when the encoding end determines that the first QP of the current block is the preset BQP, the encoding end sets the first flag to FALSE and signals the first flag set with FALSE into the bitstream.

In this way, after the bitstream is received by the decoding end, the decoding end can determine the first QP of the current block by decoding the bitstream. For example, the decoding end decodes the bitstream to obtain the first flag.

When the first flag indicates that the first QP of the current block is the second QP predicted through the QP prediction model, the decoding end predicts the second QP of the current block through the QP prediction model, and determines the predicted second QP as the first QP of the current block. When the decoding end decodes the bitstream and determines that the first flag indicates that the first QP of the current block is not the second QP predicted through the QP prediction model, the decoding end can determine the preset BQP as the first QP of the current block.

As can be seen from the above, in embodiments of the present disclosure, the encoding end uses the first flag in block level to accurately indicate whether the first QP of the current block is the second QP predicted through the QP prediction model, so that which manner is to be used to determine the first QP can be accurately determined by the decoding end according to the first flag. For example, when the first flag indicates that the first QP of the current block is the second QP predicted through the QP prediction model, the decoding end predicts the first QP of the current block through the QP prediction model. When the first flag indicates that the first QP of the current block is not the second QP predicted through the QP prediction model, the decoding end directly determines the preset BQP as the first QP of the current block. In this way, the decoding end does not need to try to compare, which can reduce the amount of calculation for determining the first QP of the current block at the decoding end, thereby improving the filtering efficiency of the decoding end.

In some embodiments, when the value of the first flag is set to a first value, the first flag indicates that the first QP of the current block is the second QP predicted through the QP prediction model.

In some embodiments, when the value of the first flag is set to a second value, the first flag indicates that the first QP of the current block is not the second QP predicted through the QP prediction model.

Embodiments of the present disclosure do not limit specific values of the first value and the second value.

Optionally, the first value is 1.

Optionally, the second value is 0.

In an example, the first flag can be indicated by a field patch_nnqp_enable_flag [compIdx][LcuIdx], where compIdx indicates the number of three colour components, and LcuIdx indicates the number of the CTU.

In a specific example, if patch_nnqp_enable_flag[compIdx][LcuIdx] is 1, the first flag indicates that the first QP of the current block is the second QP predicted through the QP prediction model. In this case, the decoding end predicts the second QP of the current block through the QP prediction model.

For example, when patch_nnqp_enable_flag[compIdx][LcuIdx]=1, the decoding end inputs the reconstructed block of the current block into the QP prediction model for QP prediction to obtain the second QP of the current block.

In some embodiments, operations at Step 2 are further included in embodiments of the present disclosure as follows.

Step 2, a second flag is determined according to the first flag of the current block, where the second flag indicates whether a first QP of at least one block in a current picture is the second QP predicted through the QP prediction model.

In this embodiment, the encoding end further uses the second flag in picture level to indicate whether the first QP of the at least one block in the current picture is the second QP predicted through the QP prediction model.

In other words, when the encoding end determines a first QP of each coding block in the current picture, the encoding end determines both the first flag and the second flag. Specifically, when the encoding end determines the first QP of each coding block in the current picture, for each coding block, if the encoding end determines that the first QP of the coding block is the second QP predicted through the QP prediction model, the encoding end sets a first flag corresponding to the coding block to TRUE, and if the encoding end determines that the first QP of the coding block is not the second QP predicted through the QP prediction model, the encoding end sets the first flag corresponding to the coding block to FALSE. According to this method, the encoding end can determine the first flag of each coding block in the current picture.

Further, the encoding end determines a second flag of the current picture according to the first flag of each coding block in the current picture.

In an example, if the value of the first flag is a first value, the value of the second flag is set to a third value, where the third value indicates that the first QP of the at least one block in the current picture is the second QP predicted through the QP prediction model.

In an example, if the value of the first flag is a second value and all values of first flags of other coding blocks except for the current block in the current picture are the second value, the value of the second flag is set to a fourth value, where the fourth value indicates that a first QP of the current picture is not the second QP predicted through the QP prediction model.

Specifically, if the first flag of each coding block (i.e., all coding blocks) in the current picture is FALSE, for example, the first flag of each coding block in the current picture is 0, it is indicated that the first QP of each coding block in the current picture is not the second QP predicted through the QP prediction model. In this case, the encoding end sets the second flag of the current picture to FALSE, for example, sets to 0, and signals the second flag set with FALSE into the bitstream. If there is a first flag of at least one coding block in the current picture that is TRUE, for example, the first flag of the at least one coding block in the current picture is 1, it is indicated that the first QP of the at least one coding block in the current picture is the second QP predicted through the QP prediction model. In this case, the encoding end sets the second flag of the current picture to TRUE, for example, sets to 1, and signals the second flag set with TRUE into the bitstream. In this way, before the decoding end decodes the first flag from the bitstream, the decoding end first decodes the bitstream to obtain the second flag. When the second flag indicates that the first QP of the at least one block in the current picture is the second QP predicted through the QP prediction model, the decoding end continues to decode the bitstream to obtain the first flag, and determines the first QP of the current block according to the first flag.

Embodiments of the present disclosure do not limit specific values of the third value and the fourth value.

Optionally, the third value is 1.

Optionally, the fourth value is 0.

In an example, the second flag can be indicated by a field picture_nnqp_enable_flag[compIdx], where compIdx indicates the number of the three colour components.

In a specific example, if picture_nnqp_enable_flag[compIdx] is 1, the second flag indicates that the first QP of the at least one block in the current picture is the second QP predicted through the QP prediction model.

In another specific example, if picture_nnqp_enable_flag[compIdx] is 0, the second flag indicates that the first QP of the current picture is not the second QP predicted through the QP prediction model.

In some embodiments, before the operations at S702 are performed, the encoding end first obtains a third flag, where the third flag indicates whether the QP prediction model is allowed to be used for a current sequence for QP prediction. If the third flag indicates that the QP prediction model is allowed to be used for the current sequence for QP prediction, the encoding end performs the operations at S702, that is, the second QP of the current block is predicted through the QP prediction model.

In some embodiments, the encoding end can signal the third flag into the bitstream. Specifically, when the encoding end determines that the QP prediction model is allowed to be used for the current sequence for QP prediction, the encoding end sets the third flag to TRUE, and signals the third flag set with TRUE into the bitstream. If the encoding end determines that the QP prediction model is not allowed to be used for the current sequence for QP prediction, the encoding end sets the third flag to FALSE, and signals the third flag set with FALSE into the bitstream. Correspondingly, before the decoding end decodes the bitstream to obtain the second flag, the decoding end first decodes the bitstream to obtain the third flag, and determines, according to the third flag, whether the QP prediction model is allowed to be used for the current sequence for QP prediction. When the third flag indicates that the QP prediction model is allowed to be used for the current sequence for QP prediction, the decoding end continues to decode the bitstream to obtain the second flag.

In some embodiments, when the value of the third flag is set to a fifth value, the third flag indicates that the QP prediction model is allowed to be used for the current sequence for QP prediction.

In some embodiments, when the value of the third flag is set to a sixth value, the third flag indicates that the QP prediction model is not allowed to be used for the current sequence for QP prediction.

Embodiments of the present disclosure do not limit specific values of the fifth value and the sixth value.

Optionally, the fifth value is 1.

Optionally, the sixth value is 0.

In an example, the third flag can be indicated by a field nnqp_enable_flag.

In a specific example, if nnqp_enable_flag is 1, the third flag indicates that the QP prediction model is allowed to be used for the current sequence for QP prediction. In this case, the decoding end continues to decode the bitstream to obtain the second flag and/or the first flag.

In another specific example, if nnqp_enable_flag is 0, the third flag indicates that the QP prediction model is not allowed to be used for the current sequence for QP prediction. In this case, the decoding end will not decode the bitstream to obtain the second flag and/or the first flag, but determines the first QP of the current block in other manners. For example, the preset BQP is directly determined as the first QP of the current block.

Embodiments of the present disclosure do not limit a specific position of the third flag in the bitstream.

In an example, the third flag is in a sequence header. In this case, the sequence header containing the third flag is defined as illustrated in Table 1.

Embodiments of the present disclosure do not limit a specific position of the second flag in the bitstream.

In an example, the second flag is in a picture header. In this case, the picture header containing the second flag is defined as illustrated in Table 2.

Embodiments of the present disclosure do not limit a specific position of the first flag in the bitstream.

In an example, the first flag is in a picture block. In this case, the picture block containing the first flag is defined as illustrated in Table 3.

In embodiments of the present disclosure, after the decoding end determines the first QP of the current block according to the operations at S703, the decoding end performs operations at S704 as follows.

S704, the reconstructed block of the current block is filtered with the neural network-based filter according to the first QP, to obtain a filtered reconstructed block.

As can be seen from the above, in embodiments of the present disclosure, the first QP is determined based on the second QP predicted through the QP prediction model. In this way, compared with attempting to determine the first QP from multiple candidate QPs, the QP is predicted through the QP prediction model in embodiment of the present embodiment, which not only reduces the complexity of determining the QP and improves the speed of determining the QP, improving the coding efficiency, but also expands the available range of the QP and improves the accuracy of the QP. When filtering is performed based on the accurately determined QP, the filtering effect can be improved, thereby improving the video compression performance.

After the first QP of the current block is determined by the encoding end according to the above method, the encoding end filters the reconstructed block of the current block through the neural network-based filter to obtain the filtered reconstructed block. The determined first QP of the current block in embodiments of the present disclosure is predicted based on feature information of the reconstructed block, and thus when the reconstructed block is filtered based on the first QP, the filtering effect of the reconstructed block can be improved.

Embodiments of the present disclosure do not limit the specific implementation of the operations at S704.

In some embodiments, the encoding end inputs the reconstructed value of the current block and the determined first QP of the current block into the neural network-based filter for filtering, to obtain the filtered reconstructed block. For example, the encoding end inputs concatenation of the reconstructed value of the current block and the first QP of the current block into the neural network-based filter for filtering, to obtain the filtered reconstructed block.

In some embodiments, to further improve the filtering effect of the reconstructed block, the encoding end can input other QPs associated with the current block, in addition to the first QP of the current block and the reconstructed block of the current block, into the neural network-based filter. Exemplarily, the encoding end can also input the reconstructed value of the current block, the determined first QP of the current block, as well as an SQP of the current slice containing the current block, and/or a BQP of the reference block of the current block into the neural network-based filter for filtering, to obtain the filtered reconstructed block.

In some embodiments, the reconstructed value of the current block is an unfiltered reconstructed block. For example, the reconstructed block of the current block is a picture block obtained by adding the residual block of the current block to the prediction block of the current block.

In some embodiments, before the encoding end filters the reconstructed value of the current block with the neural network-based filter, the encoding end can filter the reconstructed value of the current block in other filtering manners. In this case, the operations at S703 include the following. Loop filtering is performed on the reconstructed block of the current block to obtain a loop-filtered reconstructed block. The loop-filtered reconstructed block is filtered with the neural network-based filter according to the first QP, to obtain the filtered reconstructed block. For example, loop filtering is performed on the reconstructed block of the current block with DB and/or SAO, to obtain the loop-filtered reconstructed block. Then, the first QP and the loop-filtered reconstructed block are concatenated and then input into the neural network-based filter for filtering the loop-filtered reconstructed block, to obtain the filtered reconstructed block.

In a possible implementation, as illustrated in FIG. 8, the QP prediction model in embodiments of the present disclosure can be between the SAO and the NNLF. Specifically, as illustrated in FIG. 8, the reconstructed block of the current block is filtered with DB and SAO, to obtain the loop-filtered reconstructed block. Then, the loop-filtered reconstructed block, the base quantized coefficient, and the slice quantization coefficient are input into the NNQP, and the second QP of the current block is predicted through the NNQP. According to the above method, the first QP of the current block is determined from the second QP and the preset BQP. Then, the loop-filtered reconstructed block is filtered with the NNLF according to the determined first QP, to obtain the filtered reconstructed block. Optionally, the filtered reconstructed block can also be filtered again with the ALF.

The video encoding method provided in embodiments of the present disclosure includes the following. The encoding end reconstructs the current block to obtain the reconstructed block of the current block. The encoding end predicts the second QP of the current block through the QP prediction model. The encoding end determines the first QP of the current block according to the second QP. The encoding end filters the reconstructed block of the current block with the neural network-based filter according to the first QP, to obtain the filtered reconstructed block. In other words, in embodiments of the present disclosure, the QP is predicted through the QP prediction model, which can expand the available range of the QP, thereby improving the accuracy of the QP. When filtering is performed based on the accurately determined QP, the filtering effect can be improved, thereby improving the video compression performance.

Figure 11:
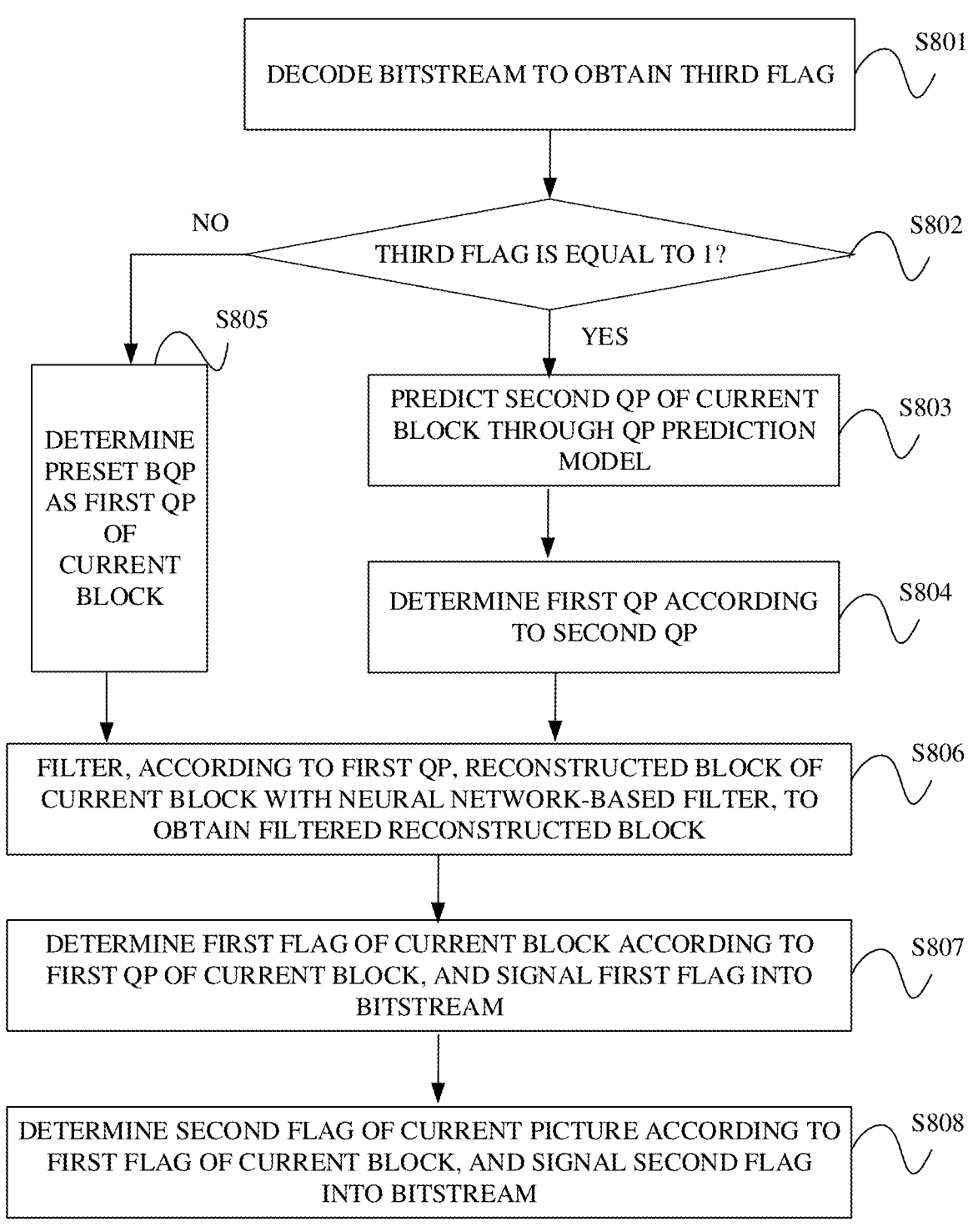
FIG. 11 is a schematic flowchart of video encoding provided in an embodiment of the present disclosure.

FIG. 11 is a schematic flowchart of video encoding provided in an embodiment of the present disclosure. A video encoding method as illustrated in FIG. 11 can be considered as a specific and feasible embodiment of the video encoding method illustrated in FIG. 10. As illustrated in FIG. 11, the video encoding method in embodiments of the present disclosure includes the following.

A current block is reconstructed to obtain a reconstructed block of the current block.

In some embodiments, the encoding end performs inverse transform on a transform coefficient of the current block to obtain a residual block of the current block, and adds the residual block to a prediction block to obtain the reconstructed block of the current block.

In some embodiments, the encoding end performs inverse quantization on a quantization coefficient of the current block to obtain the transform coefficient of the current block, performs inverse transform on the transform coefficient of the current block to obtain the residual block of the current block, and adds the residual block to the prediction block to obtain the reconstructed block of the current block.

S801, a bitstream is decoded to obtain a third flag.

The third flag indicates whether a QP prediction model is allowed to be used for a current sequence for QP prediction.

S802, whether the third flag is equal to 1 is determined.

In some embodiments, if the third flag=1, the third flag indicates that the QP prediction model is allowed to be used for the current sequence for QP prediction. In this case, operations at S803 are performed.

In some embodiments, if the third flag=0, the third flag indicates that the QP prediction model is not allowed to be used for the current sequence for QP prediction. In this case, operations at S805 are performed.

S803, a second QP of the current block is predicted through the QP prediction model.

For example, the reconstructed block of the current block and at least one preset third QP are input into the QP prediction model for QP prediction to obtain the second QP.

In an example, the reconstructed block of the current block and the at least one preset third QP are concatenated and then input into the QP prediction model for QP prediction to obtain the second QP.

Optionally, the at least one preset third QP includes at least one of: a BQP, an SQP, and a QP of a reference block of the current block.

For the specific implementation process of the operations at S803, reference can be made to the descriptions of the operations at S702, which is not repeated herein.

S804, a first QP is determined according to the second QP.

For example, the first QP is determined according to the second QP and a preset BQP.

Exemplarily, a distortion corresponding to the second QP is determined. A distortion corresponding to the preset BQP is determined. The first QP is determined from the second QP and the preset BQP according to the distortion corresponding to the second QP and the distortion corresponding to the preset BQP.

For example, a QP with the minimum distortion from the second QP and the preset BQP is determined as the first QP of the current block, thereby improving the accuracy of determining the first QP. When picture filtering is performed on the reconstructed block of the current block based on the accurately determined first QP, the filtering effect of the reconstructed block can be improved.

For the specific implementation process of the operations at S804, reference can be made to the descriptions of the operations at S703, which is not repeated herein.

S805, the preset BQP is determined as the first QP of the current block.

S806, the reconstructed block of the current block is filtered with a neural network-based filter according to the first QP, to obtain a filtered reconstructed block.

In some embodiments, loop filtering is performed on the reconstructed block of the current block, to obtain a loop-filtered reconstructed block. The loop-filtered reconstructed block is filtered with the neural network-based filter according to the first QP, to obtain the filtered reconstructed block.

S807, a first flag of the current block is determined according to the first QP of the current block, and the first flag is signalled into the bitstream.

The first flag indicates whether the first QP of the current block is the second QP predicted through the QP prediction model.

In some embodiments, when the encoding end determines that the first QP of the current block is the second QP predicted through the QP prediction model, the encoding end sets the first flag to TRUE and signals the first flag set with TRUE into the bitstream.

In some embodiments, if the encoding end determines that the first QP of the current block is the preset BQP, the encoding end sets the first flag to FALSE and signals the first flag set with FALSE into the bitstream.

It can be noted that the operations at S807 and S806 may be executed in any order. For example, the operations at S807 may be executed before the operations at S806, after the operations at S806, or simultaneously with the operations at S806, which is not limited in the present disclosure.

S808, a second flag of a current picture is determined according to the first flag of the current block, and the second flag is signalled into the bitstream.

The second flag indicates whether a first QP of at least one block in the current picture is the second QP predicted through the QP prediction model.

In an example, if the value of the first flag is a first value, the value of the second flag is set to a third value, where the third value indicates that the first QP of the at least one block in the current picture is the second QP predicted through the QP prediction model.

In an example, if the value of the first flag is a second value and all values of first flags of other coding blocks except for the current block in the current picture are the second value, the value of the second flag is set to a fourth value, where the fourth value indicates that a first QP of the current picture is not the second QP predicted through the QP prediction model.

Further, in some embodiments, technical solutions provided in embodiments of the present disclosure are preliminarily trained and tested based on a VVC test model (VTM) 11.0-nnvc reference platform.

The NNQP was trained, an existing NNLF, such as a solution of JVET-Y0078, was chosen, and then performance was tested with a combination of NNQP in the present disclosure and the NNLF. General sequences specified in JVET were tested under the random access (RA) configuration under the general test condition, and test results of some sequences are illustrated in Table 4 and Table 5 below.

TABLE 4

| RA performance of NNQP + NNLF compared with VTM11.0-nnvc | | |
|---|---|---|
| | Random Access | |
| Y | U | V |
| Class B | −8.06% | −24.02% | −20.81% |
| Class C | −7.87% | −20.05% | −18.59% |
| Class D | −9.41% | −19.32% | −19.68% |

TABLE 5

| RA performance of NNQP + NNLF compared with NNLF | | |
|---|---|---|
| | Random Access | |
| Y | U | V |
| Class B | −0.09% | −0.79% | −0.82% |
| Class C | −0.08% | −0.26% | −0.32% |
| Class D | −0.02% | 0.14% | −0.16% |

As illustrated in Table 4 and Table 5, as can be seen from the comparison between the performance data of these two tables, by introducing the learning-based QP prediction model in the present disclosure, coding performance can be improved certainly on the basis of the NNLF, especially on a U component and a V component. Meanwhile, a sequence with a higher resolution has relatively better performance because of the increase in the frequency of using the solutions in the present disclosure. Subsequently, the performance can be further improved by optimizing the training.

In embodiments of the present disclosure, the encoding end determines the first flag and the second flag, and signals the first flag and the second flag into the bitstream. In this way, the decoding end can decode the bitstream to obtain the first flag and the second flag, and then accurately determine, according to the first flag and the second flag, which manner is to be used to determine the first QP. For example, when the decoding end determines that the first QP of the current block is the second QP predicted through the QP prediction model, the decoding end predicts the first QP of the current block through the QP prediction model. When the decoding end determines that the first QP of the current block is not the second QP predicted through the QP prediction model, the decoding end directly determines the preset BQP as the first QP of the current block, or determines the first QP in other manners. In this way, the accuracy and the amount of calculation for determining the first QP of the current block are reduced at the decoding end, thereby improving the filtering efficiency of the decoding end.

It may be noted that FIG. 5 to FIG. 11 are only examples of the present disclosure, which may not be construed as a limitation to the present disclosure.

The preferred embodiments of the present disclosure have been described in detail above in conjunction with the accompanying drawings. However, the present disclosure is not limited to the specific details in the above embodiments. Within the scope of the technical concept of the present disclosure, various simple modifications may be made to the technical solutions of the present disclosure. These simple modifications all belong to the protection scope of the present disclosure. For example, the various specific technical features described in the above specific embodiment manners can be combined in any suitable manner if there is no contradiction. As another example, any combination of various embodiments of the present disclosure can also be made, as long as they do not violate the idea of the present disclosure, which may also be regarded as the content disclosed in the present disclosure.

It may also be understood that in the various method embodiments of the present disclosure, the sequence numbers of the above-mentioned processes do not mean the order of execution, and the order of execution of the processes may be determined by their functions and internal logic, and may not be used in this disclosure. The embodiment of the examples constitutes no limitation. In addition, in embodiments of the present disclosure, the term "and/or" is only an association relationship describing associated objects, indicating that there may be three relationships. Specifically, A and/or B may mean A exists alone, A and B exist simultaneously, and B exists alone. In addition, the character "/" in this article generally indicates that the contextual objects are an "or" relationship.

The method embodiments in the present disclosure are described in detail above with reference to FIG. 5 to FIG. 11. In the following, apparatus embodiments of the present disclosure will be described in detail with reference to FIG. 12 to FIG. 15.

Figure 12:
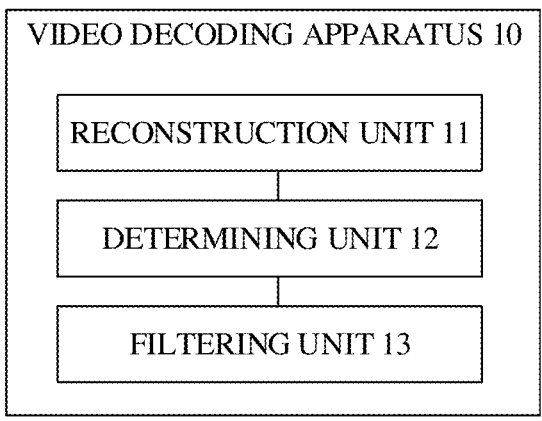
FIG. 12 is a schematic block diagram of a video decoding apparatus provided in embodiments of the present disclosure.

FIG. 12 is a schematic block diagram of a video decoding apparatus provided in embodiments of the present disclosure.

As illustrated in FIG. 12, the video decoding apparatus 10 includes a reconstruction unit 11, a determining unit 12, and a filtering unit 13. The reconstruction unit 11 is configured to decode a bitstream and determine a reconstructed block of a current block. The determining unit is configured to decode the bitstream and determine a first QP of the current block, where the first QP is determined based on a second QP predicted through a QP prediction model. The filtering unit is configured to filter, according to the first QP, the reconstructed block of the current block by a neural network-based filter, to obtain a filtered reconstructed block.

In some embodiments, the determining unit 12 is specifically configured to decode the bitstream to obtain the first QP of the current block.

In some embodiments, the determining unit 12 is specifically configured to predict the second QP of the current block through the QP prediction model, and determine the first QP according to the second QP.

In some embodiments, the determining unit 12 is specifically configured to determine the first QP according to the second QP and a preset BQP.

In some embodiments, the determining unit 12 is specifically configured to determine a distortion corresponding to the second QP, determine a distortion corresponding to the preset BQP, and determine, according to the distortion corresponding to the second QP and the distortion corresponding to the preset BQP, the first QP from the second QP and the preset BQP.

In some embodiments, the determining unit 12 is specifically configured to determine a QP with a minimum distortion from the second QP and the preset BQP as the first QP.

In some embodiments, the determining unit 12 is specifically configured to filter, according to the second QP, the reconstructed block of the current block with the neural network-based filter, to obtain a first filtered reconstructed block, and determine the distortion corresponding to the second QP according to the first filtered reconstructed block and a reconstructed value of the current block.

In some embodiments, the determining unit 12 is specifically configured to input concatenation of the reconstructed value of the current block and the second QP into the neural network-based filter for filtering, to obtain the first filtered reconstructed block.

In some embodiments, the determining unit 12 is specifically configured to filter, according to the preset BQP, the reconstructed block of the current block with the neural network-based filter, to obtain a second filtered reconstructed block, and determine the distortion corresponding to the preset BQP according to the second filtered reconstructed block and a reconstructed value of the current block.

In some embodiments, the determining unit 12 is specifically configured to input concatenation of the reconstructed value of the current block and the preset BQP into the neural network-based filter for filtering, to obtain the second filtered reconstructed block.

In some embodiments, the determining unit 12 is specifically configured to decode the bitstream to obtain a first flag, where the first flag indicates whether the first QP of the current block is the second QP predicted through the QP prediction model, in response to the first flag indicating that the first QP of the current block is the second QP predicted through the QP prediction model, predict the second QP of the current block through the QP prediction model, and determine the second QP as the first QP.

In some embodiments, the determining unit 12 is further configured to, in response to the first flag indicating that the first QP of the current block is not the second QP predicted through the QP prediction model, determine the preset BQP as the first QP of the current block.

In some embodiments, the determining unit 12 is specifically configured to decode the bitstream to obtain a second flag, where the second flag indicates whether a first QP of at least one block in a current picture is the second QP predicted through the QP prediction model; and in response to the second flag indicating that the first QP of the at least one block in the current picture is the second QP predicted through the QP prediction model, decode the bitstream to obtain the first flag.

In some embodiments, the determining unit 12 is further configured to, in response to the second flag indicating that a first QP of the current picture is not the second QP predicted through the QP prediction model, determine a preset BQP as the first QP of the current block.

In some embodiments, the determining unit 12 is specifically configured to decode the bitstream to obtain a third flag, where the third flag indicates whether the QP prediction model is allowed to be used for a current sequence for QP prediction; and in response to the third flag indicating that the QP prediction model is allowed to be used for the current sequence for QP prediction, decode the bitstream to obtain the second flag.

In some embodiments, the determining unit 12 is specifically configured to input the reconstructed block of the current block and the at least one preset third QP into the QP prediction model for QP prediction, to obtain the second QP.

In some embodiments, the determining unit 12 is specifically configured to input concatenation of the reconstructed block of the current block and the at least one preset third QP into the QP prediction model for QP prediction, to obtain the second QP.

Optionally, the at least one preset third QP includes at least one of: a BQP, an SQP, and a QP of a reference block of the current block.

In some embodiments, the QP prediction model includes multiple convolutional layers and at least one fully connected layer.

Optionally, the QP prediction model further includes multiple pooling layers.

Optionally, one of the multiple convolutional layers is followed by one pooling layer.

In some embodiments, the second QP predicted through the QP prediction model is a candidate QP with a maximum probability among N preset candidate QPs, where N is a positive integer greater than 1.

In some embodiments, the number of the N preset candidate QPs is greater than the number of candidate QPs corresponding to BQPs.

In some embodiments, the filtering unit 13 is specifically configured to perform loop filtering on the reconstructed block of the current block to obtain a loop-filtered reconstructed block, and filter, according to the first QP, the loop-filtered reconstructed block with the neural network-based filter, to obtain the filtered reconstructed block.

It may be understood that the apparatus embodiments and the method embodiments may correspond to each other, and similar descriptions may refer to the method embodiments. To avoid repetition, details are not repeated herein. Specifically, the video decoding apparatus 10 as illustrated in FIG. 12 can execute the decoding method in embodiments of the present disclosure, and the aforementioned and other operations and/or functions of each unit in the video decoding apparatus 10 are configured to implement related operations of the decoding method, which is not repeated herein for the sake of brevity.

Figure 13:
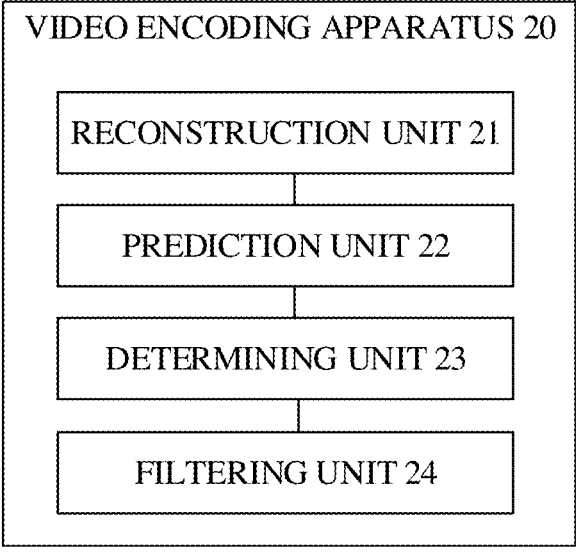
FIG. 13 is a schematic block diagram of a video encoding apparatus provided in embodiments of the present disclosure.

FIG. 13 is a schematic block diagram of a video encoding apparatus provided in embodiments of the present disclosure.

As illustrated in FIG. 13, the video encoding apparatus 20 includes a reconstruction unit 21, a prediction unit 22, a determining unit 23, and a filtering unit 24. The reconstruction unit is configured to reconstruct a current block to obtain a reconstructed block of the current block. The prediction unit is configured to predict a second QP of the current block through a QP prediction model. The determining unit is configured to determine a first QP of the current block according to the second QP. The filtering unit is configured to filter, according to the first QP, the reconstructed block of the current block by a neural network-based filter, to obtain a filtered reconstructed block.

In some embodiments, the prediction unit 22 is specifically configured to input the reconstructed block of the current block and at least one preset third QP into the QP prediction model for QP prediction, to obtain the second QP.

Optionally, the at least one preset third QP includes at least one of a BQP, an SQP, and a QP of a reference block of the current block.

In some embodiments, the determining unit 23 is specifically configured to determine the first QP according to the second QP and a preset BQP.

In some embodiments, the determining unit 23 is specifically configured to determine a distortion corresponding to the second QP, determine a distortion corresponding to the preset BQP, and determine, according to the distortion corresponding to the second QP and the distortion corresponding to the preset BQP, the first QP from the second QP and the preset BQP.

In some embodiments, the determining unit 23 is specifically configured to filter, according to the second QP, the reconstructed block of the current block with the neural network-based filter, to obtain a first filtered reconstructed block, and determine the distortion corresponding to the second QP according to the first filtered reconstructed block and a reconstructed value of the current block.

In some embodiments, the determining unit 23 is specifically configured to input concatenation of the reconstructed value of the current block and the second QP into the neural network-based filter for filtering, to obtain the first filtered reconstructed block.

In some embodiments, the determining unit 23 is specifically configured to filter, according to the preset BQP, the reconstructed block of the current block with the neural network-based filter, to obtain a second filtered reconstructed block, and determine the distortion corresponding to the preset BQP according to the second filtered reconstructed block and a reconstructed value of the current block.

In some embodiments, the determining unit 23 is specifically configured to input concatenation of the reconstructed value of the current block and the preset BQP into the neural network-based filter for filtering, to obtain the second filtered reconstructed block.

In some embodiments, the determining unit 23 is specifically configured to determine a QP with a minimum distortion from the second QP and the preset BQP as the first QP.

In some embodiments, the determining unit 23 is further configured to determine a first flag according to the first QP, where the first flag indicates whether the first QP of the current block is the second QP predicted through the QP prediction model.

In some embodiments, the determining unit 23 is specifically configured to, in response to the first QP being the second QP, set a value of the first flag to a first value, where the first value indicates that the first QP of the current block is the second QP predicted through the QP prediction model.

In some embodiments, the determining unit 23 is specifically configured to, in response to the first QP being the preset BQP, set the value of the first flag to a second value, where the second value indicates that the first QP of the current block is not the second QP predicted through the QP prediction model.

In some embodiments, the determining unit 23 is further configured to determine a second flag according to the first flag, where the second flag indicates whether a first QP of at least one block in a current picture is the second QP predicted through the QP prediction model.

In some embodiments, the determining unit 23 is specifically configured to, in response to the value of the first flag being the first value, set a value of the second flag to a third value, where the third value indicates that the first QP of the at least one block in the current picture is the second QP predicted through the QP prediction model.

In some embodiments, the determining unit 23 is specifically configured to, in response to the value of the first flag being the second value and all values of first flags of other coding blocks except for the current block in the current picture are the second value, set the value of the second flag to a fourth value, where the fourth value indicates that a first QP of the current picture is not the second QP predicted through the QP prediction model.

In some embodiments, the prediction unit 22 is specifically configured to obtain a third flag, where the third flag indicates whether the QP prediction model is allowed to be used for a current sequence for QP prediction, and in response to the third flag indicating that the QP prediction model is allowed to be used for the current sequence for QP prediction, predict the second QP of the current block through the QP prediction model.

In some embodiments, the prediction unit 22 is specifically configured to input concatenation of the reconstructed block of the current block and the at least one preset third QP into the QP prediction model for QP prediction, to obtain the second QP.

In some embodiments, the QP prediction model includes multiple convolutional layers and at least one fully connected layer.

Optionally, the QP prediction model further includes multiple pooling layers.

Optionally, one of the multiple convolutional layers is followed by one pooling layer.

In some embodiments, the second QP predicted through the QP prediction model is a candidate QP with a maximum probability among N preset candidate QPs, where N is a positive integer greater than 1.

In some embodiments, the number of the N preset candidate QPs is greater than the number of candidate QPs corresponding to BQPs.

In some embodiments, the filtering unit 24 is specifically configured to perform loop filtering on the reconstructed block of the current block to obtain a loop-filtered reconstructed block, and filter, according to the first QP, the loop-filtered reconstructed block with the neural network-based filter, to obtain the filtered reconstructed block.

It may be understood that the apparatus embodiments and the method embodiments may correspond to each other, and similar descriptions may refer to the method embodiments. To avoid repetition, details are not repeated herein. Specifically, the video encoding apparatus 20 as illustrated in FIG. 13 can execute the encoding method in embodiments of the present disclosure, and the aforementioned and other operations and/or functions of each unit in the video encoding apparatus 20 are configured to implement related operations of the encoding method, etc. For the sake of brevity, the corresponding processes are not repeated herein.

The apparatus and system of the embodiments of the present disclosure are described above from the perspective of functional units with reference to the accompanying drawings. It may be understood that the functional units may be implemented in the form of hardware, may also be implemented by instructions in the form of software, and may also be implemented by a combination of hardware and software units. Specifically, each step of the method embodiments in the present disclosure can be completed by an integrated logic circuit of the hardware in the processor and/or instructions in the form of software, and the steps of the method disclosed in embodiments of the present disclosure can be directly executed by a hardware coding processor or a combination of hardware and software units in the decoding processor. Optionally, the software unit may be located in a mature storage medium in the field such as random access memory, flash memory, read-only memory, programmable read-only memory, electrically erasable programmable memory, and registers. The storage medium is located in the memory, and the processor reads the information from the memory, and completes the steps in the above method embodiments in combination with its hardware.

Figure 14:
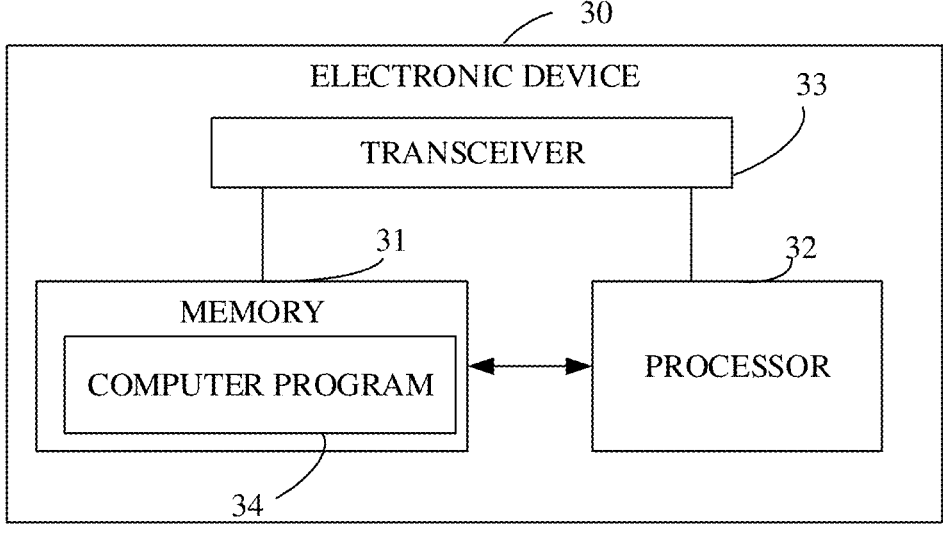
FIG. 14 is a schematic block diagram of an electronic device provided in embodiments of the present disclosure.

FIG. 14 is a schematic block diagram of an electronic device provided in embodiments of the present disclosure.

As illustrated in FIG. 14, the electronic device 30 may be the video encoder or video decoder described in embodiments of the present disclosure. The electronic device 30 may include a memory 33 and a processor 32. The memory 33 is configured to store a computer program 34 and transmit the program code 34 to the processor 32. In other words, the processor 32 can call and run the computer program 34 from the memory 33 to implement the method in embodiments of the present disclosure.

For example, the processor 32 can be configured to execute the steps in the above-mentioned method according to the instructions in the computer program 34.

In some embodiments of the present disclosure, the processor 32 may include, but is not limited to: a general-purpose processor, digital signal processor (DSP), application-specific integrated circuit (ASIC), field programmable gate array (FPGA), or other programmable logic devices, discrete gates or transistor logic devices, discrete hardware components, and so on.

In some embodiments of the present disclosure, the memory 33 includes but is not limited to: volatile memory and/or non-volatile memory. The non-volatile memory can be a read-only memory (ROM), programmable read-only memory (PROM), erasable programmable read-only memory (EPROM), electrically programmable erase programmable read-only memory (EEPROM), or flash. The volatile memory may be random access memory (RAM), which acts as an external cache. By way of illustration and not limitation, many forms of RAM are available such as static RAM (SRAM), dynamic RAM (DRAM), synchronous DRAM (SDRAM), double data rate synchronous dynamic random access memory (DDR SDRAM), enhanced synchronous dynamic random access memory (enhanced SDRAM, ESDRAM), synchronous connection dynamic random access memory (synch link DRAM, SLDRAM) and direct memory bus random access memory (direct rambus RAM, DR RAM).

In some embodiments of the present disclosure, the computer program 34 can be divided into one or more units, and the one or more units are stored in the memory 33 and executed by the processor 32 to complete the methods in the present disclosure. The one or more units may be a series of computer program instruction segments capable of accomplishing specific functions, and the instruction segments are used to describe the execution process of the computer program 34 in the electronic device 30.

As illustrated in FIG. 14, the electronic device 30 may also include a transceiver 33, where the transceiver 33 may be connected to the processor 32 or the memory 33. The processor 32 can control the transceiver 33 to communicate with other devices, specifically, to send information or data to other devices, or receive information or data sent by other devices. The transceiver 33 may include a transmitter and a receiver. The transceiver 33 may further include antennas, and the number of antennas may be one or more.

It may be understood that the various components in the electronic device 30 are connected through a bus system, where the bus system includes not only a data bus, but also a power bus, a control bus, and a status signal bus.

Figure 15:
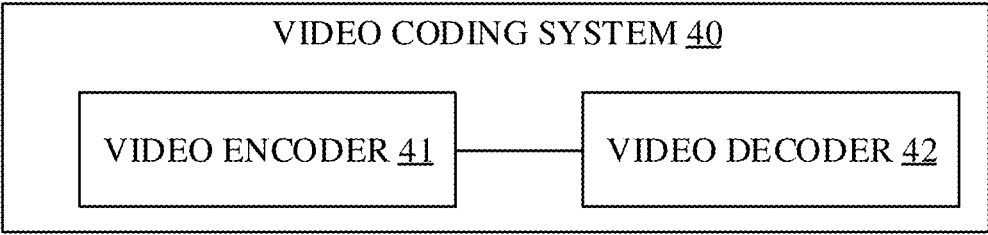
FIG. 15 is a schematic block diagram of a video coding system provided in embodiments of the present disclosure.

FIG. 15 is a schematic block diagram of a video coding system provided in embodiments of the present disclosure.

As illustrated in FIG. 15, the video coding system 40 may include a video encoder 41 and a video decoder 42, where the video encoder 41 is configured to execute the video encoding method involved in embodiments of the present disclosure, and the video decoder 42 is configured to execute the video decoding method involved in embodiments of the present disclosure.

In some embodiments, the present disclosure further provides a bitstream. The bitstream is obtained according to the encoding method.

The present disclosure further provides a computer storage medium, on which a computer program is stored, and when the computer program is executed by a computer, the computer can execute the methods of the above method embodiments. In other words, the embodiments of the present disclosure further provide a computer program product including instructions, and when the instructions are executed by a computer, the computer executes the methods of the foregoing method embodiments.

When implemented using software, the present disclosure may be implemented in whole or in part in the form of a computer program product. The computer program product includes one or more computer instructions. When the computer program instructions are loaded and executed on the computer, the processes or functions according to the embodiments of the present disclosure will be generated in whole or in part. The computer can be a general-purpose computer, a special-purpose computer, a computer network, or other programmable devices. The computer instructions may be stored in or transmitted from one computer-readable storage medium to another computer-readable storage medium, for example, the computer instructions may be transferred from a website, computer, server, or data center by wire (such as coaxial cable, optical fiber, digital subscriber line (DSL)) or wireless (such as infrared, wireless, microwave, etc.) to another website site, computer, server or data center. The computer-readable storage medium may be any available medium that can be accessed by a computer, or a data storage device such as a server or a data center integrated with one or more available media. The available medium may be a magnetic medium (such as a floppy disk, a hard disk, or a magnetic tape), an optical medium (such as a digital video disc (DVD)), or a semiconductor medium (such as a solid state disk (SSD)), etc.

Those skilled in the art can appreciate that the units and algorithm steps of the examples described in conjunction with the embodiments disclosed herein can be implemented by electronic hardware, or a combination of computer software and electronic hardware. Whether these functions are executed by hardware or software depends on the specific disclosure and design constraints of the technical solution. Those skilled in the art may use different methods to implement the described functions for each specific disclosure, but such embodiment may not be regarded as exceeding the scope of the present disclosure.

In the several embodiments provided in this disclosure, it may be understood that the disclosed systems, apparatuses, and methods may be implemented in other ways. For example, the apparatus embodiments described above are only illustrative. For example, the division of the units is only a logical function division. In actual embodiment, there may be other division methods. For example, multiple units or components can be combined or can be integrated into another system, or some features may be ignored, or not implemented. In another point, the mutual coupling or direct coupling or communication connection illustrated or discussed may be through some interfaces, and the indirect coupling or communication connection of devices or units may be in electrical, mechanical, or other forms.

A unit described as a separate component may or may not be physically separated, and a component displayed as a unit may or may not be a physical unit, that is, it may be located in one place, or may be distributed to multiple network units. Part or all of the units can be selected according to actual needs to achieve the purpose of the solution of this embodiment. For example, each functional unit in each embodiment of the present disclosure may be integrated into one processing unit, each unit may exist separately physically, or two or more units may be integrated into one unit.

The above is only a specific embodiment of the present disclosure, but the scope of protection of the present disclosure is not limited thereto. Those skilled in the art can easily think of changes or substitutions within the technical scope disclosed in the present disclosure, which may be covered within the scope of protection of this disclosure. Therefore, the protection scope of the present disclosure may be based on the protection scope of the claims.

What is claimed is:

1. A video decoding method, comprising:
   decoding a bitstream and determining a reconstructed block of a current block;
   decoding the bitstream and determining a first quantization parameter (QP) of the current block, wherein the first QP is determined based on a second QP predicted through a QP prediction model; and
   filtering, according to the first QP, the reconstructed block of the current block with a neural network-based filter, to obtain a filtered reconstructed block.

2. The method of claim 1, wherein determining the first QP of the current block comprises:
   decoding the bitstream to obtain the first QP of the current block.

3. The method of claim 1, wherein determining the first QP of the current block comprises:
   predicting the second QP of the current block through the QP prediction model; and
   determining the first QP according to the second QP.

4. The method of claim 3, wherein determining the first QP according to the second QP comprises:

determining the first QP according to the second QP and a preset base quantization parameter (BQP).

5. The method of claim 4, wherein determining the first QP according to the second QP and the preset BQP comprises:

determining a distortion corresponding to the second QP;

determining a distortion corresponding to the preset BQP; and determining, according to the distortion corresponding to the second QP and the distortion corresponding to the preset BQP, the first QP from the second QP and the preset BQP.

6. The method of claim 5, wherein determining, according to the distortion corresponding to the second QP and the distortion corresponding to the preset BQP, the first QP from the second QP and the preset BQP comprises:

determining a QP with a minimum distortion from the second QP and the preset BQP as the first QP.

7. The method of claim 5, wherein determining the distortion corresponding to the second QP comprises:

filtering, according to the second QP, the reconstructed block of the current block with the neural network-based filter, to obtain a first filtered reconstructed block; and determining the distortion corresponding to the second QP according to the first filtered reconstructed block and a reconstructed value of the current block.

8. The method of claim 7, wherein filtering, according to the second QP, the reconstructed block of the current block with the neural network-based filter, to obtain the first filtered reconstructed block comprises:

inputting concatenation of the reconstructed value of the current block and the second QP into the neural network-based filter for filtering, to obtain the first filtered reconstructed block.

9. The method of claim 5, wherein determining the distortion corresponding to the preset BQP comprises:

filtering, according to the preset BQP, the reconstructed block of the current block with the neural network-based filter, to obtain a second filtered reconstructed block; and determining the distortion corresponding to the preset BQP according to the second filtered reconstructed block and a reconstructed value of the current block.

10. The method of claim 9, wherein filtering, according to the preset BQP, the reconstructed block of the current block with the neural network-based filter, to obtain the second filtered reconstructed block comprises:

inputting concatenation of the reconstructed value of the current block and the preset BQP into the neural network-based filter for filtering, to obtain the second filtered reconstructed block.

11. The method of claim 1, wherein determining the first QP of the current block comprises:

decoding the bitstream to obtain a first flag, wherein the first flag indicates whether the first QP of the current block is the second QP predicted through the QP prediction model;

in response to the first flag indicating that the first QP of the current block is the second QP predicted through the QP prediction model, predicting the second QP of the current block through the QP prediction model; and determining the second QP as the first QP.

12. The method of claim 11, further comprising:

in response to the first flag indicating that the first QP of the current block is not the second QP predicted through the QP prediction model, determining a preset BQP as the first QP of the current block.

13. The method of claim 11, wherein decoding the bitstream to obtain the first flag comprises:

decoding the bitstream to obtain a second flag, wherein the second flag indicates whether a first QP of at least one block in a current picture is the second QP predicted through the QP prediction model; and in response to the second flag indicating that the first QP of the at least one block in the current picture is the second QP predicted through the QP prediction model, decoding the bitstream to obtain the first flag.

14. The method of claim 13, further comprising:

in response to the second flag indicating that a first QP of the current picture is not the second QP predicted through the QP prediction model, determining a preset BQP as the first QP of the current block.

15. The method of claim 13, wherein decoding the bitstream to obtain the second flag comprises:

decoding the bitstream to obtain a third flag, wherein the third flag indicates whether the QP prediction model is allowed to be used for a current sequence for QP prediction; and in response to the third flag indicating that the QP prediction model is allowed to be used for the current sequence for QP prediction, decoding the bitstream to obtain the second flag.

16. The method of claim 3, wherein predicting the second QP of the current block through the QP prediction model comprises:

inputting the reconstructed block of the current block and at least one preset third QP into the QP prediction model for QP prediction, to obtain the second QP.

17. The method of claim 16, wherein inputting the reconstructed block of the current block and the at least one preset third QP into the QP prediction model for QP prediction, to obtain the second QP comprises:

inputting concatenation of the reconstructed block of the current block and the at least one preset third QP into the QP prediction model for QP prediction, to obtain the second QP.

18. The method of claim 16, wherein the at least one preset third QP comprises at least one of: a BQP, a slice quantization parameter (SQP), or a QP of a reference block of the current block.

19. A video encoding method, comprising:

reconstructing a current block to obtain a reconstructed block of the current block;

predicting a second quantization parameter (QP) of the current block through a QP prediction model;

determining a first QP of the current block according to the second QP; and filtering, according to the first QP, the reconstructed block of the current block with a neural network-based filter, to obtain a filtered reconstructed block.

20. A video decoder, comprising:

at least one processor; and a memory coupled to the at least one processor and storing at least one computer executable instruction thereon which, when executed by the at least one processor, causes the at least one processor to:

decode a bitstream and determine a reconstructed block of a current block;

decode the bitstream and determine a first quantization
parameter (QP) of the current block, wherein the first
QP is determined based on a second QP predicted
through a QP prediction model; and filter, according to the first QP, the reconstructed block
of the current block with a neural network-based
filter, to obtain a filtered reconstructed block.

\* \* \* \* \*